United States Patent [19]

Christian et al.

[11] Patent Number: 5,442,793
[45] Date of Patent: Aug. 15, 1995

[54] METHOD AND SYSTEM FOR LOCATING AN INHERITED VIRTUAL FUNCTION MEMBER OF A DERIVED CLASS

[75] Inventors: Bradford A. Christian, Kirkland; Scott A. Randell, Redmond; Steven J. Sinofsky, Seattle, all of Wash.

[73] Assignee: Microsoft Corporation, Redmond, Wash.

[21] Appl. No.: 352,424

[22] Filed: Dec. 8, 1994

Related U.S. Application Data

[63] Continuation of Ser. No. 25,375, Feb. 26, 1993, abandoned.

[51] Int. Cl.$^6$ .............................................. G06F 9/42
[52] U.S. Cl. .................... 395/700; 364/DIG. 1; 364/255.7; 364/261; 364/261.4
[58] Field of Search .................... 395/650, 700; 364/255.7, 261, 268.4, 280

[56] References Cited

U.S. PATENT DOCUMENTS

| | | | |
|---|---|---|---|
| 5,093,914 | 12/1992 | Coplien et al. | 395/700 |
| 5,297,284 | 6/1994 | Jones et al. | 395/700 |
| 5,327,562 | 7/1994 | Adcock | 395/700 |
| 5,371,891 | 12/1994 | Gray et al. | 395/700 |

OTHER PUBLICATIONS

Margaret A. Ellis and Bjarne Stroustrup, "The Annotated C++ Reference Manual"; Chapter 10: pp. 195-237 (1990).

*Primary Examiner*—Thomas M. Heckler
*Assistant Examiner*—Backenstose
*Attorney, Agent, or Firm*—Seed and Berry

[57] ABSTRACT

A mechanism for locating and calling an appropriate member function to process a message or command in an event-based system is provided. An object data structure contains data members and a pointer to a virtual function table. The virtual function table contains pointers to member functions associated with the object. The virtual function table contains a pointer to a member function that returns the address of a message map. The message map contains two entries: a pointer to a base message map and a pointer to an array of message map entries. The array of message map entries contains the addresses and parameters of member functions. A default window procedure member function searches the array of message map entries to locate a desired member function. If the desired member function is not located in the array of message map entries for the derived class, then the window procedure member function searches the array of message map entries for the base class of the derived class.

12 Claims, 4 Drawing Sheets

METHOD AND SYSTEM FOR LOCATING AN INHERITED VIRTUAL FUNCTION MEMBER OF A DERIVED CLASS

CROSS-REFERENCE TO RELATED APPLICATION

This application is a continuation of U.S. Pat. application Ser. No. 08/025,375, filed Feb. 26, 1993, now abandoned.

TECHNICAL FIELD

This invention relates generally to message routing in a computer system, and more specifically, to the routing of messages and commands in an event-based, object-oriented environment.

BACKGROUND OF THE INVENTION

In typical event driven windowing systems, such as Microsoft Windows, events trigger the passing of messages between windows and between a window and the windowing system. Every window that a program creates has an associated window procedure. This window procedure is a function that could be either in the program itself or in a dynamic link library. The window procedure processes messages sent to the window. Very often these messages inform a window of user input from the keyboard or mouse. Other messages tell a window when it is being resized or when the surface of the window needs to be repainted.

When the windowing system detects an event directed to a certain window, the windowing system routes an appropriate message to that window by calling the window's window procedure. The window procedure does some processing based on the message and then returns control to the windowing system.

A program that uses a window must register the window with the windowing system. When registering a window, the program specifies the window procedure that is to receive messages for the window by specifying a window class. A window class identifies the window procedure associated with a window. The use of a window class allows multiple windows to be based on the same window class and hence use the same window procedure. For example, in Microsoft Windows all button windows are typically created based on the same window class. Only the first instance of the program needs to register the window class. After the window class is registered, the window class then becomes available to all subsequent instances of the program. When a program registers a window, the programmer defines additional characteristics of the window that are unique to that window. A window class can also be registered in a dynamic link library so the window class is available to all programs.

After a program's window is created and displayed, the program makes itself ready to accept input from the user. When an input event occurs, the windowing system translates the event into a message and invokes the window procedure for the appropriate window.

The code in Table A is an example of a window procedure for a window that displays the message "Hello, World!"

TABLE A

```
LONG WndProc (HWND hwnd, UINT message, UINT wParam,
LONG lParam)
{
```

TABLE A-continued

```
switch (message)
    {
    case WM_PAINT:
        [Instructions for painting "Hello, World!" in a
        window]
        ...
        return 0;
    case WM_COMMAND:
        switch (wParam)
            {
            case IDM_ABOUT:
                [instructions for processing About command]
                ...
                return 0;
            case IDM_EXIT
                [instructions for processing EXIT command]
                ...
                return 0;
            .
            .
            }
        return 0;
    case WM_DESTROY:
        [instructions for destroying window]
        ...
        return 0;
    case WM_SIZE:
        [instructions for sizing window]
        ...
        return 0;
    .
    .
    }
return DefWindowProc (hwnd, message, wParam, lParam);
}
```

The first parameter of the window procedure WndProc is hwnd, the handle to the window receiving the message. If a program creates multiple windows based on the same window class (and hence the same window procedure), then hwnd identifies the particular window receiving the message. The second parameter, message, is a 16-bit unsigned integer that identifies the message. The last two parameters, wParam and lParam, provide more information about the message.

The switch and case construction is used in the window procedure to determine what message the window procedure is receiving and how to process the message accordingly. The window procedure contains a case statement for every message the window procedure will process. Because the message parameter in this example is a 16-bit unsigned integer, message can identify 65,536 ($2^{16}$) unique messages, which requires a rather unwieldy switch statement. Additionally, the switch statement can be multi-dimensional, i.e., a switch statement within a switch statement, as shown in regard to the processing of WM_COMMAND messages.

As an example of a call to WndProc, assume a user wants to resize a window, MyWindow, associated with WndProc. The user provides input to the windowing system, which translates the input into a message and then calls WndProc. The hwnd parameter is the handle to MyWindow; the message parameter is WM_SIZE; the wParam parameter contains a number from 0 through 4 that decodes to provide additional information on why the message was sent; and the lParam parameter contains the new size of the window. The meaning of wParam and lParam depends on the message type. These message parameters can be pointers to structures or they can be composites of flags and fields. All messages not processed in the window procedure are usually passed to a default function, DefWindowProc.

An event driven system such as Microsoft Windows can be implemented using object-oriented programming techniques. Object-oriented programming techniques employ a concept referred to as inheritance to allow the sharing of code. To understand the concept of inheritance, it is helpful to understand object-oriented programming techniques generally. Two common characteristics of object-oriented programming languages are support for data encapsulation and data type inheritance. Data encapsulation refers to the binding of functions and data. Inheritance refers to the ability to declare a data type in terms of other data types.

In the C++ programming language, object-oriented techniques are supported through the use of classes. A class is a user-defined type. A class declaration describes the data members and member functions of the class. For example, the following instructions define data members and a member function of a class named CIRCLE.

```
class CIRCLE
{
public:
    int x, y;
    int radius;
    void draw( );
};
```

Variables x and y specify the center location of a circle and variable radius specifies the radius of the circle. These variables are referred to as data members of the class CIRCLE. The function draw is a user-defined function that draws the circle of the specified radius at the specified location. The function draw is referred to as a member function of class CIRCLE. The data members and member functions of a class are bound together in that the function operates on an object of the class. An instance of a class is also called an instance of the class.

In the syntax of C++, the following statement defines the objects a and b to be of type class CIRCLE.
CIRCLE a, b;
This definition causes the allocation of memory for the objects a and b. The following statements assign data to the data members of objects a and b.

```
a.x = 2;
a.y = 2;
a.radius = 1;
b.x = 4;
b.y = 5;
b.radius = 2;
```

The following statements are used to draw the circles defined by objects a and b.
a.draw();
b.draw();

A derived class is a class that inherits the characteristics-data members and member functions—of its base classes. For example, the following derived class CIRCLE_FILL inherits the characteristics of the base class CIRCLE.

```
class CIRCLE_FILL : CIRCLE
{
public:
    int pattern;
    void fill( );
};
```

This class definition specifies that class CIRCLE_FILL includes all the data and member functions that are in class CIRCLE in addition to those data and member functions introduced in the declaration of class CIRCLE_FILL, that is, data member pattern and member function fill. In this example, class CIRCLE_FILL has data members x, y, radius, and pattern and member functions draw and fill. Class CIRCLE_FILL is said to "inherit" the characteristics of class CIRCLE.

A class that inherits the characteristics of another class is a derived class (e.g., CIRCLE_FILL). A class whose characteristics are inherited by another class is a base class (e.g., CIRCLE is a base class of CIRCLE_FILL). A class can be both a base class and a derived class. A derived class may inherit the characteristics of several classes, that is, a derived class may have several base classes. This is referred to as multiple inheritance.

A class may also specify whether its member functions are virtual. Declaring that a member function is virtual means that the function can be overridden by a function of the same name and type in a derived class. The ability to redefine a member function in a derived class is known as polymorphism. Polymorphism allows a programmer to define a base class that includes routines that perform standard operations on groups of related objects without regard to the type of each object. The programmer can redefine member functions in derived classes, taking into account the type of the object. In the following example, the function draw is declared to be virtual in classes CIRCLE and CIRCLE_FILL.

```
class CIRCLE
{
public:
    int x, y;
    int radius;
    virtual void draw( );
};
class CIRCLE_FILL : CIRCLE
{
public:
    int pattern;
    virtual void draw( );
};
```

The C++ language provides a pointer data type. A pointer holds values that are addresses of objects in memory. Through a pointer, an object can be referenced. The following statement declares variable c_ptr to be a pointer on an object of type class CIRCLE and sets variable c_ptr to hold the address of object c.
CIRCLE *c_ptr;
c_ptr=&c;
Continuing with the same example, the following statement declares object a to be of type class CIRCLE and object b to be of type class CIRCLE_FILL.
CIRCLE a;
CIRCLE_FILL b;
The following statement refers to the function draw as defined in class CIRCLE.
a.draw();

Whereas, the following statement refers to the function draw defined in class CIRCLE_FILL.

b.draw();

Moreover, the following statements type cast object b to an object of type class CIRCLE and invoke the function draw that is defined in class CIRCLE_FILL.

```
CIRCLE *c_ptr;
c_ptr = &b;
c_ptr→draw( );        //  CIRCLE_FILL::draw( )
```

Thus, the virtual member function that is called is function CIRCLE_FILL::draw ().

FIG. 1 is a block diagram illustrating typical data structures used to represent an object. An object is composed of data members and member functions, which implement the behavior of the object. The data structures used to represent an object comprise object data structure 101, virtual member function table 102, and member functions 103, 104, 105. The object data structure 101 contains data members and a pointer to the virtual function table 102. The virtual function table 102 contains an entry for each virtual member function defined for the object. Each entry contains a reference to the code that implements the corresponding member function.

When a class introduces a virtual member function, then the compiler allocates a virtual function table for the class. The class data structure contains the layout of the data members and internal pointers. The internal pointers are virtual function table pointers. These pointers are initialized during run time to point to the virtual function table associated with the class. During compile time, the compiler initializes the virtual function tables with addresses corresponding to virtual member functions.

A virtual function table for a class contains addresses corresponding to the virtual member functions associated with that class. The virtual function table is used at run time to invoke the virtual member functions indirectly. Each class with a virtual member function has an associated virtual function table. The virtual function table contains the address of each virtual member function in the class in order of declaration. The data structure for such a class contains a virtual function table pointer (pVTable). When memory for a data structure is allocated at run time, the virtual function table pointer is initialized with the address of the associated virtual function table. Thus, all objects of a certain class type point to the same virtual function table. To implement the invoking of a virtual member function, the compiler generates code to access the virtual member function through the virtual function table.

A derived class inherits a copy of the virtual function tables associated with its direct base classes. Also, a derived class that introduces a virtual member function either has an additional virtual function table or shares one of its inherited virtual function tables. A derived class is said to "introduce" a virtual member function if there are no other virtual member functions of the same name and type in any of its direct base classes. A derived class shares an inherited virtual function table by appending the entries for the member functions introduced in the derived class to the inherited table.

FIG. 2 illustrates sample data structures of an object 201 associated with a class A, an object 207 associated with a class B derived from class A, and an object 209 associated with a class C derived from class B. A virtual function table 202 associated with the object 201 of class A contains pointers to member functions 203, 204, 205.

The object 207 of class B inherits the member functions 203, 205 of class A, and overrides the member function 204 with a member function 206. A virtual function table 208 associated with object 207 of class B contains pointers to the member functions 203, 205, 206. The object 209 of class C inherits the member functions 203, 205, 206 of class B. A virtual function table 210 associated with the object 209 of class C contains the same pointers as the virtual function table 208 associated with the object 207 of class B.

Storing multiple copies of a virtual function table for each derived class of a base function can use up substantial amounts of memory. For example, in the Microsoft Windows Foundation Classes Version 1.0, the class CWnd is comprised of approximately two hundred member functions. Because the class CFrameWnd is derived from the class CWnd, the derived class CFrameWnd is comprised of approximately two hundred inherited member functions plus six introduced member functions. A complete listing of the data members and member functions of each of these classes may be found in the Microsoft C/C++ Class Libraries Reference (1991), which is hereby incorporated by reference.

SUMMARY OF THE INVENTION

In a preferred embodiment, the present invention provides a mechanism for locating and calling an appropriate member function to process a message or command.

One embodiment of the present invention provides a mechanism for locating and calling an appropriate member function to process a message or command in an event-based system. An object data structure contains data members and a pointer to a virtual function table. The virtual function table contains pointers to member functions associated with the object. The virtual function table contains a pointer to a member function that returns the address of a message map. The message map contains two entries: a pointer to a base message map and a pointer to an array of message map entries.

The array of message map entries contains the addresses and parameters of member functions. A default window procedure member function searches the array of message map entries to locate a desired member function. If the desired member function is not located in the array of message map entries for the derived class, then the window procedure member function searches the array of message map entries for the base class of the derived class.

DETAILED DESCRIPTION OF THE INVENTION

A preferred embodiment of the present invention provides a method and system for routing messages and commands in an event-based system using object-oriented programming techniques. In a preferred embodiment, the present invention is implemented using the programming language C++. Although the present invention is described as implemented using the C++ programming language, one skilled in the art would know that the methods of the present invention can be implemented using other object oriented or non object-oriented programming languages.

As discussed previously, programs written for event-based systems such as Microsoft Windows are referred to as "event driven." The user interacts with the windows, menus, and controls in the user interface of an application program. User-generated events, such as mouse clicks and keystrokes, cause "messages" to be sent to an appropriate window for handling. Taking advantage of object-oriented techniques, one embodiment of the present invention uses member functions to process messages so that many different objects can share the same code. An application program must have a mechanism for both locating the appropriate member function to respond to a message and calling the member function.

In a preferred embodiment, the present invention provides a mechanism that uses a message map for locating and calling an appropriate member function to respond to a message.

Figure 1:
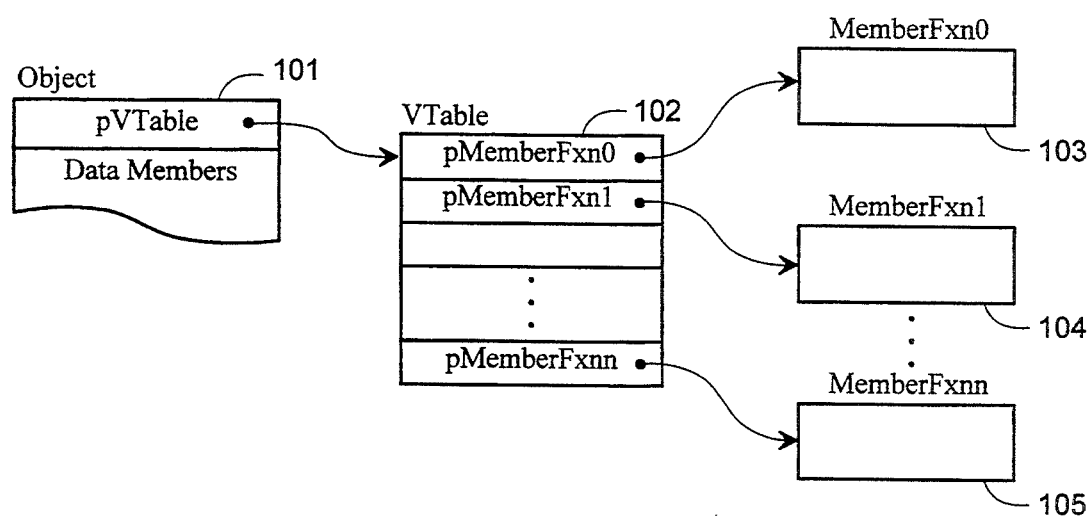
FIG. 1 is a block diagram illustrating typical data structures used to represent an object.
Figure 2:
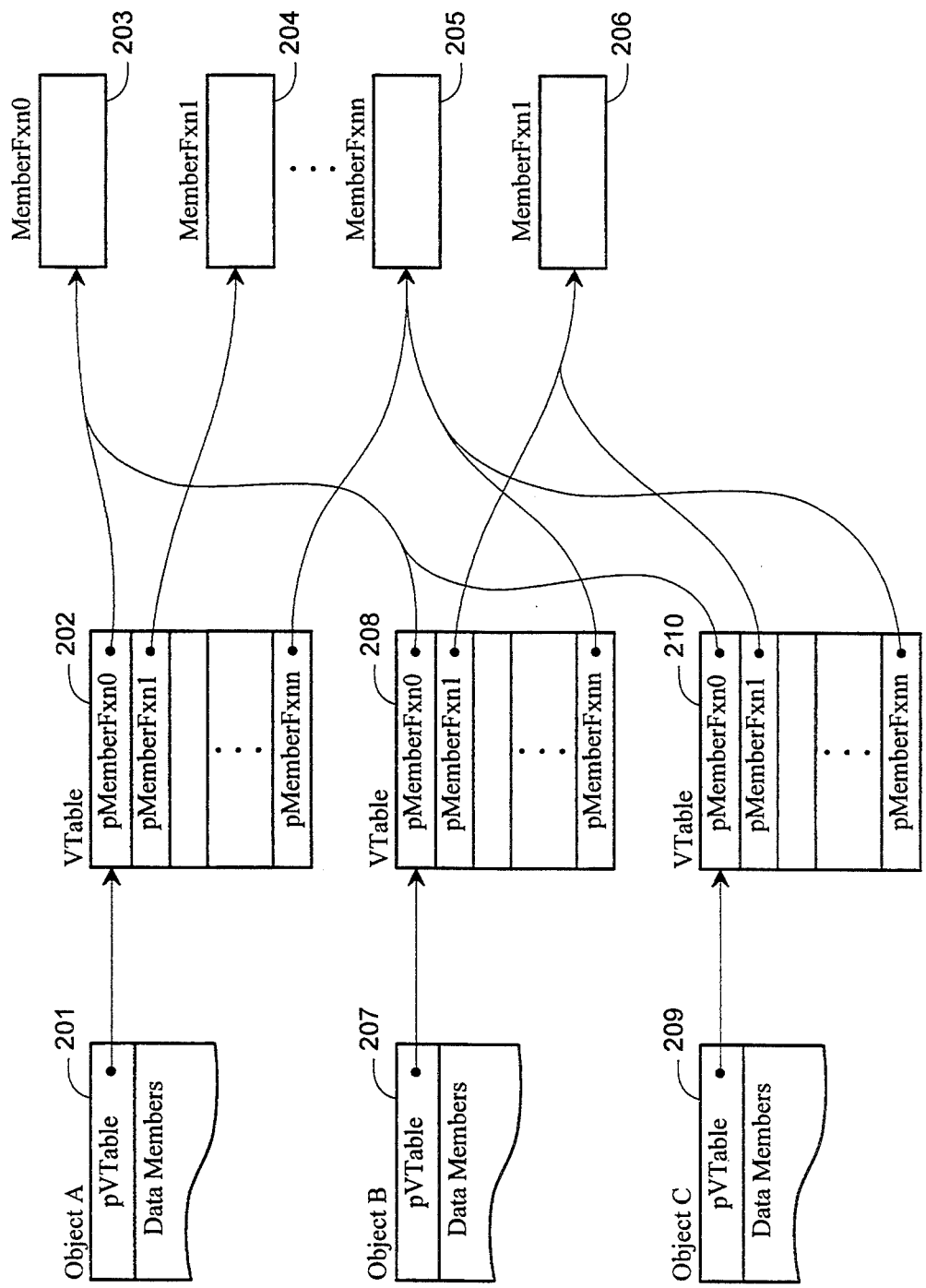
FIG. 2 is a block diagram illustrating a sample data structure used to represent objects from derived classes.
Figure 3:
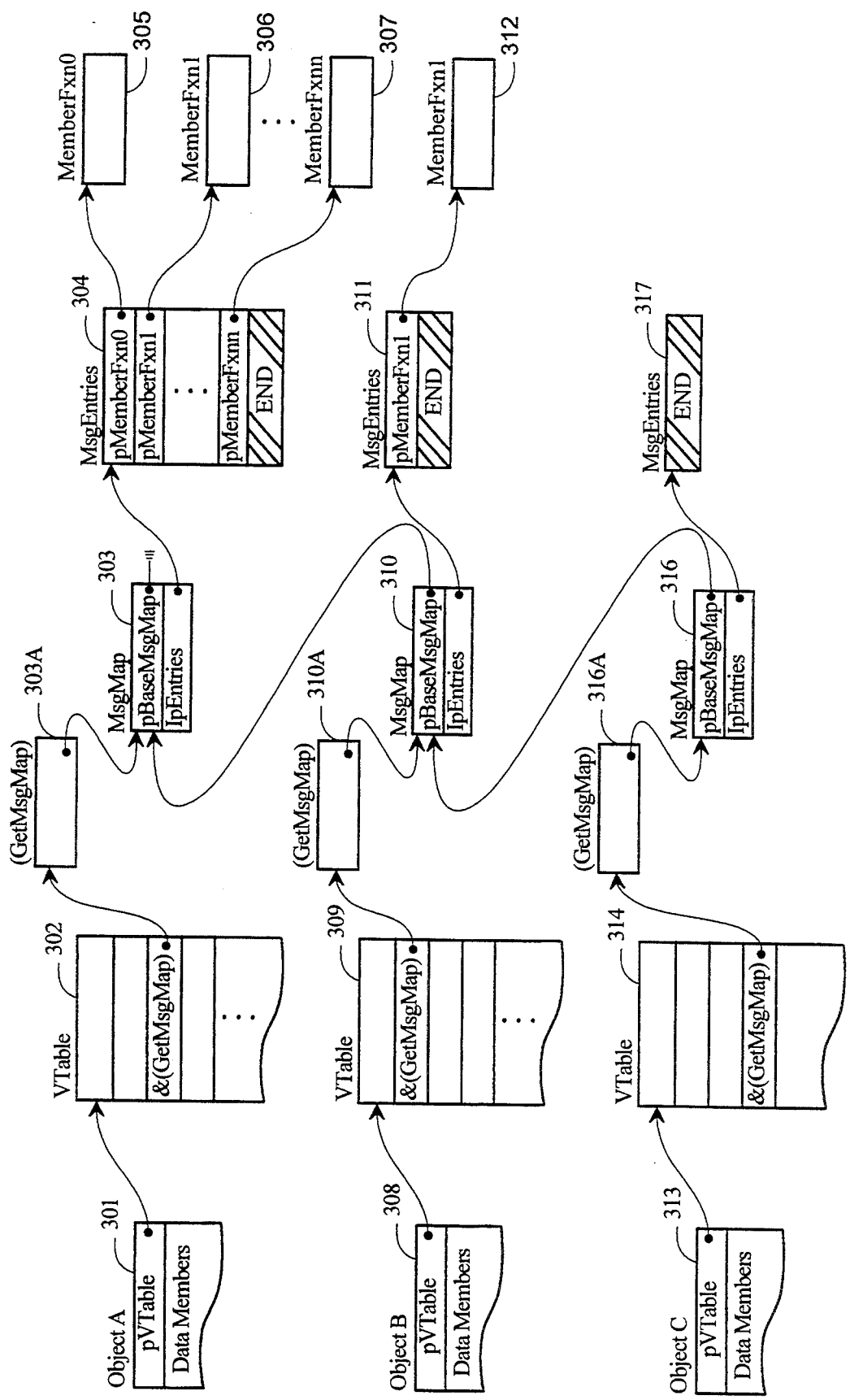
FIG. 3 is a block diagram illustrating data structures used to implement the methods of the present invention.

FIG. 3 is a block diagram illustrating sample data structures used to implement a preferred embodiment of the present invention. An object data structure 301 of class A contains data members and a pointer to a virtual function table 302. The virtual function table 302 contains pointers to member functions associated with class A. The virtual table 302 contains a pointer to a member function GetMessageMap that returns the address of a message map 303. The message map 303 contains two entries: a pointer to a base message map and a pointer to an array of message map entries 304. Because class A is not a derived class, the pointer to a base message map is a null pointer. The array of message map entries 304 contains the addresses of member functions 305, 306, 307.

An object 308 of class B derived from class A contains data members and a pointer to a virtual function table 309. The virtual function table 309 contains a pointer to the member function GetMessageMap. When called, the member function GetMessageMap returns the address of a message map 310. The message map 310 contains a pointer to the message map 303, which is a base message map for message map 310. The message map 310 also contains a pointer to an array of message map entries 311. Because class B overrides Member Function1 of class A, the array of message map entries 311 contains a pointer to the overriding MemberFunction1 312.

An object 313 of class C derived from class B contains data members and a pointer to a virtual function table 314. The virtual function table 314 contains a pointer to the member function GetMessageMap. When called, the member function GetMessageMap returns the address of a message map 315. The message map 315 contains a pointer to the message map 310, which is the base message map for message map 315. The message map 315 also contains a pointer to an array of message entries 314. Because the object 313 does not introduce or override any member functions, the array of message entries 314 preferably contains only a null entry indicating the end of the array. Each of the arrays of message map entries 304, 311, 314 preferably contain a null entry indicating the end of the table. The null entry is used when searching the array of message map entries.

The message maps 303, 310, 315 represent a hierarchy of message maps. Each class preferably has its own message map and objects of a class share a message map. The message processing mechanism can search the hierarchy of messages maps to locate the appropriate member function.

Table C contains pseudocode for the function, WndProc, that implements a message processing mechanism. When an event occurs, the windowing system determines which window should receive notification. The windowing system scans its list of registered window objects and selects a window object. The windowing system invokes the member function WndProc of the selected object passing the message and other parameters. The member function WndProc first invokes the member function GetMsgMap to retrieve a pointer to the message map for the object. The function WndProc then searches the message entry for a message that matches the passed message. If a matching message is found, the function WndProc invokes the associated function and then returns. If no matching message is found in the message entries, then the function WndProc selects the pointer to the message map of the base class. The function WndProc then searches the message entries for the message map of the base class. This searching continues until either a match is found or there are no more base classes. If there are no more base classes, the function WndProc invokes the default window handling procedure and returns.

TABLE C

```
void WndProc(Message, wparam, lparam)
{
    pMsgMap = this→GetMsgMap( );
    while(pMsgMap!=null)
    {lpentries=pMsgMap→lpentries;
    while(lpentries→entry!=END)
    {
        if(lpentries→message==message)
            {lpentries→pfn( );
            return
            }
        lpentries++;
    }
    pMsgMap=pMsgMap→pBaseMsgMap;
    }
    return(DefProcWindow( ));
}
```

In an event-based system such as Microsoft Windows, version 3.1, a window procedure function (see WndProc described above) processes a particular window's incoming messages. The message ID is a function parameter that is typically decoded with the switch statement. The ID is compared to a list of expected codes, specified by case statements, to find the appropriate function to process the message. As shown above in Table A, a switch statement can be multi-dimensional (WM_COMMAND). The present invention utilizes the techniques of C++ to provide a mapping from messages to member functions so that when an object receives a message the appropriate member function is called automatically.

As described previously, a message is sent to an object by the windowing system in response to a keystroke, mouse click, window move, control window activity, or other user input. If necessary, a program can instruct the windowing system to send a notification message to a particular window. The message map of the present invention provides links with the member functions for a particular object.

In the programming language C++, data members and member functions are specified within a class definition. In a preferred embodiment of the present invention, the message map is a table that is included within a class definition. The message map for a base class should contain an entry for each member function of the base class. The message map for a derived class should contain an entry for each message that the programmer intends to process with a custom-written member function, along with a pointer to the base message map. The result is a message-processing system that provides all the advantages of virtual member functions without the storage overhead.

In one embodiment of the present invention, a cache of recently handled messages is used to speed up searches through the message map. The cache holds the contents of frequently accessed entries in a message map and the addresses where these entries are stored. When the window procedure searches the array of message entries for a particular entry, the window procedure checks to see whether the cache holds that entry. If the cache does hold the entry, the member function's address is returned to the processor; if the cache does not hold the entry, the window procedure searches the message map to find the entry.

In systems implemented using object-oriented techniques, many member functions are predefined in base classes. If a programmer chooses not to utilize the predefined member functions for a derived class, the programmer must write overriding member functions for the derived class. If a programmer chooses to utilize the predefined member functions, the predefined member functions may pass the message to a default message-handler function.

A function prototype for each member function in the derived class is preferably placed in the header of the derived class, and a message map entry is coded as described below. The message map table must be defined outside of the scope of any function or class definition. It must be emphasized that in a preferred embodiment, message maps depend on standard preprocessor macros and not on any extensions to the C++ language.

As example of how to use the methods of the present invention, sample C++ code is provided below in Table B. A description of the data structures used to implement the code is also provided. The program causes a window to be displayed on the display screen with the words "Hello, World!" centered inside of the window.

TABLE B

```
class CMainWindow : public CFrameWnd
{
public:
    CMainWindow( );
    void OnPaint( );
    void OnAbout( );
    //DECLARE_MESSAGE_MAP( )
private:
    static MSGMAP_ENTRY    msgEntries[ ];
protected:
    static MSGMAP    msgMap;
    virtual MSGMAP* GetMsgMap ( ) const;
};
struct MSGMAP_ENTRY
{
    UINT    nMessage;
```

TABLE B-continued

```
    UINT    nID;
    UINT    nSig;
    PMSG    pfn;
}
struct MSGMAP
{
    MSGMAP*        pBaseMsgMap;
    MSGMAP_ENTRY   lpEntries;
};
void CMainWindow::OnPaint( )
{
    [code to paint "Hello, World!" in a window]
    .
    .
    .
}
void CMainWindow::OnAbout( )
{
    [code to process About command]
    .
    .
    .
}
//BEGIN_MESSAGE_MAP
    MSGMAP*   CMainWindow::GetMsgMap( )   const
        {return &CMainWindow::msgMap;}
    MSGMAP    CMainWindow::msgMap =
        &(CFrameWnd::msgMap),
        &(CMainWindow::msgEntries)};
    MSGMAP_ENTRY  CMainWindow::msgEntries[ ] =
    {
        //ON_WM_PAINT( )
        [WM_CREATE, nID, nSig, pfn]
        //ON_COMMAND(IDM_ABOUT, OnAbout)
        [CN_COMMAND, nID, nSig, pfn]
    //END_MESSAGE_MAP( )
        {0, 0, Sig_end, (PMSG)0}
    };
```

To cause a window to be displayed on the screen, the code in Table B derives a main window class CMainWindow. The CMainWindow constructor creates a window with the appropriate style, size, menu, etc. The class CMainWindow overrides two message-handler member function, OnAbout and OnPaint and declares a message map.

The code of Table B sets up message hooks for a window. The code that places entries in the array msgentries is preferably located with the code for the main window class, but not inside the scope of any function or class definition. The message map created by the code connects specific messages with member functions of a derived window. The message map is part of the derived window class, therefore writing it is part of writing the derived class.

When the contents of the window's client area change or when the client area must be redrawn, the windowing system sends a WM_PAINT message to the window. The OnPaint member function is designed to handle the WM_PAINT message. The member function OnAbout handles WM_COMMAND messages so that an About dialog box can be added to the window. The methods used by the OnPaint and the OnAbout member functions are not described in more detail because they are not germane to the present invention.

When defining a message map for a class, a programmer preferably declares a private array for entries of the message map, a protected CMessageMap, and a protected virtual member function to return the address of the message map.

In the data structure MSGMAP_ENTRY, the variable nMessage represents a message code, the variable nID represents a control ID, the variable nSig represents a signature type or a pointer to a message number, and the variable pfn represents a pointer to the message handler routine.

In the data structure MSGMAP, the variable pBaseMsgMap represents a pointer to a message map of the direct base class, if one exists, and the variable lpEntries represents a pointer to an array of message entries for the appropriate class.

After the message map has been declared, the message map table is preferably defined with message map entries. The message map table begins with an instruction that defines the class handled by the message map and the base class to which unhandled messages are passed. The end of the message entries is marked with the insertion of a null entry.

An entry in the array of message map entries preferably contains a message code, a control ID, a signature type or a pointer to a message number, and a pointer to the appropriate message handler routine. The code marked by the comment //BEGIN_MESSAGE_MAP determines the address of the message map created by the code marked by //DECLARE_MESSAGE_MAP places pBaseMessageMap (the address of the message map of the base class) in the message map, and then initiates placing the entries in the message map. The array of message map entries is preferably given a special entry to signify the end of the message map. As shown above in Table B, the derived window CMainWindow will handle the WM_PAINT message and the IDM_ABOUT menu command. It is important to realize that the message map parent class/child class relationship is not established through the normal C++ inheritance mechanism.

As shown in FIG. 3, a message map for a derived class is linked to its direct base class message map. When the windowing system sends a message to an object such as a window, the window's window procedure searches the message map attached to the window comparing the message ID of the message with the message field of each entry. If a matching entry is found, the wSig field of the entry is used to encode parameters to pass to the member function whose pointer, pfn, is also stored in the entry. If an entry is not found, then the message map of the window object's base class is searched. This process continues until the appropriate message-handler member function is found or the top of the base class hierarchy is found, at which point the message is passed to a default message-handler function so the system can perform any default processing.

Figure 4:
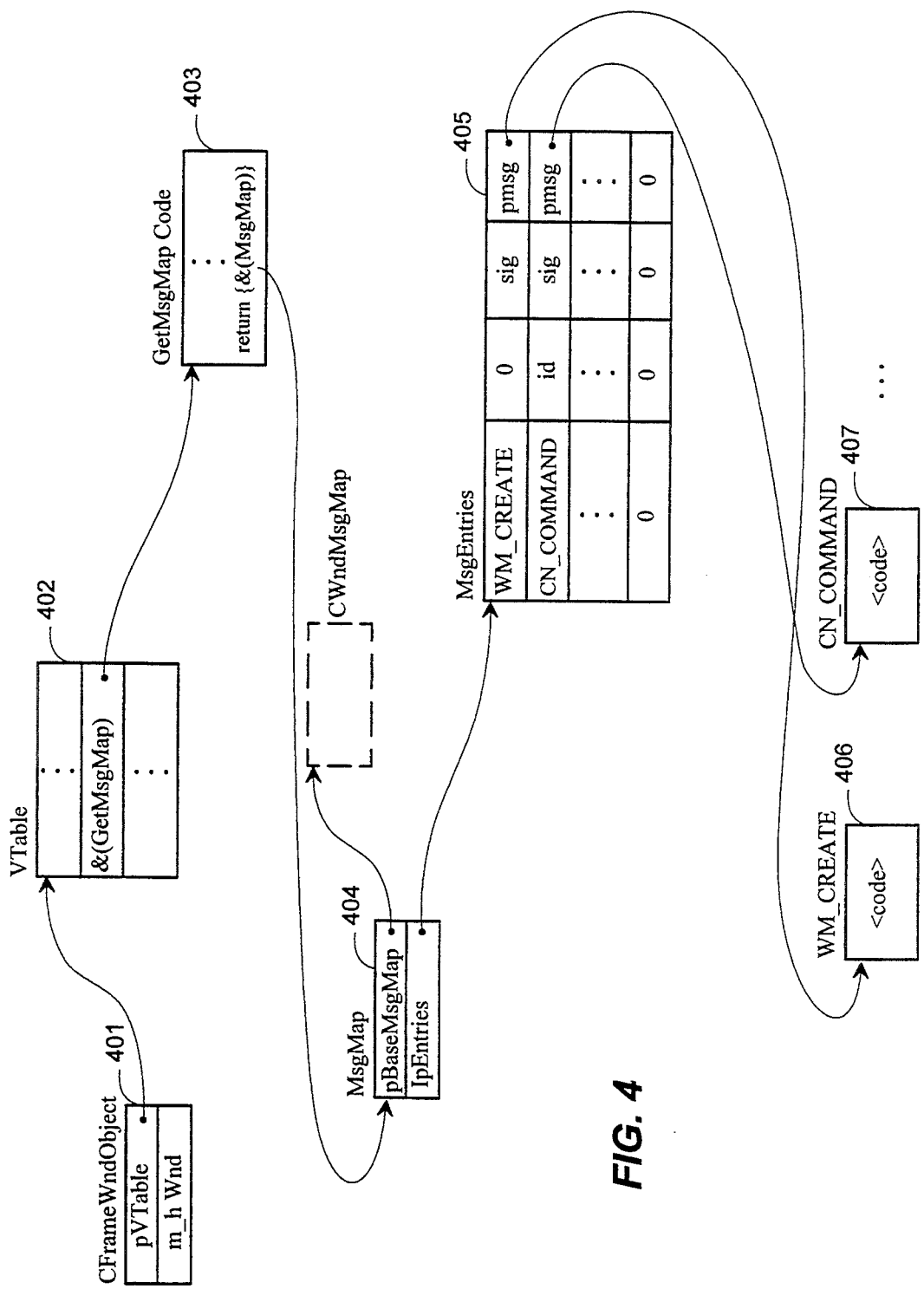
FIG. 4 is a block diagram illustrating data structures used to implement code contained in Table B.

FIG. 4 shows the data structures created for the code of Table B. An object data structure 401 contains data members and a pointer to a virtual function table 402. The virtual function table 402 contains a pointer to function member GetMsgMap 403. When called, the function member GetMsgMap returns the address of a message map 404. The message map 404 contains a pointer to a base message map of the class CWnd, which is not shown in the drawing. The message map 404 also contains a pointer to an array of message entries 405. In a preferred embodiment of the present invention, each entry in the array of message entries contains four fields: nMessage, nID, nSIG, and pfn, which are all described above. By having multiple fields in each entry, multi-dimensional message selection can be made with a single entry. The field pfn contains a pointer to member functions 406, 407.

Using the methods of the present invention, there is no longer any "program logic flow" as in conventional procedural programming. Each window object is self-sufficient and is responsible for acting on the messages that are important to it, and sending messages to other window objects. The interaction among window objects, and thus the flow of the program, is governed by the actions of the end user.

Appendix A contains a C++ header file for a preferred embodiment. Appendix B contains macro definitions which implement a preferred embodiment. Appendix C contains the C++ code that implements message handling mechanism.

Although the present invention has been described in terms of a preferred embodiment, it is not intended that the invention be limited to this embodiment. Modifications within the spirit of the invention will be apparent to those skilled in the art, the scope of the present invention is defined by the claims which follow.

*APPENDIX A*

```
// Microsoft Foundation Classes C++ library.
// Copyright (C) 1992 Microsoft Corporation,
// All rights reserved.

// This source code is only intended as a supplement to the
// Microsoft Foundation Classes Reference and Microsoft
// QuickHelp and/or WinHelp documentation provided with the library.
// See these sources for detailed information regarding the
// Microsoft Foundation Classes product.

// Do not include this file directly (included by AFXWIN.H)

/////////////////////////////////////////////////////////////////////////

// Entries in a message map (a 'AFX_MSGMAP_ENTRY') table can be of six formats
// 1) control notification message (i.e. in response to WM_COMMAND)
//        nNotifyCode, nControlID, signature type, parameterless member function
//        (eg: LBN_SELCHANGE, IDC_LISTBOX, AfxSig_vv, ... )
// 2) Update Command UI
//        -1, nControlID, signature Unknown, parameterless member function
// 3) menu/accelerator notification message (i.e. special case of first format)
//        0, nID, signature type, parameterless member function
//        (eg: 0, IDM_FILESAVE, AfxSig_vv, ... )
```

```
// 4) constant windows message
//      nMessage, 0, signature type, member function
//      (eg: WM_PAINT, 0, ...)
// 5) variable windows message (using RegisterWindowMessage)
//      0xC000, 0, &nMessage, special member function
// 6) variable control notification message (i.e. in response to WM_VBXEVENT)
//      0xC001, nControlID, &nMessage, special member function
//      (eg: LBN_SELCHANGE, IDC_LISTBOX, AfxSig_vv, ... )

// The end of the message map is marked with a special value
//      0, 0, AfxSig_end, 0

//////////////////////////////////////////////////////////////////////// enum AfxSig
{
    AfxSig_end = 0,     // [marks end of message map]

AfxSig_bD,          // BOOL (CDC*)
    AfxSig_bb,          // BOOL (BOOL)
    AfxSig_bWww,        // BOOL (CWnd*, UINT, UINT)
    AfxSig_hDWw,        // HBRUSH (CDC*, CWnd*, UINT)
    AfxSig_iwWw,        // int (UINT, CWnd*, UINT)
    AfxSig_iWww,        // int (CWnd*, UINT, UINT)
    AfxSig_is,          // int (LPSTR)
    AfxSig_lwl,         // LRESULT (WPARAM, LPARAM)
    AfxSig_lwwM,        // LRESULT (UINT, UINT, CMenu*)
    AfxSig_vv,          // void (void)

AfxSig_vw,          // void (UINT)
    AfxSig_vww,         // void (UINT, UINT)
    AfxSig_vvii,        // void (int, int) // wParam is ignored
    AfxSig_vwww,        // void (UINT, UINT, UINT)
    AfxSig_vwii,        // void (UINT, int, int)
    AfxSig_vwl,         // void (UINT, LPARAM)
    AfxSig_vbWW,        // void (BOOL, CWnd*, CWnd*)
    AfxSig_vD,          // void (CDC*)
    AfxSig_vM,          // void (CMenu*)
    AfxSig_vMwb,        // void (CMenu*, UINT, BOOL)

AfxSig_vW,          // void (CWnd*)
    AfxSig_vWww,        // void (CWnd*, UINT, UINT)
    AfxSig_vWh,         // void (CWnd*, HANDLE)
    AfxSig_vwW,         // void (UINT, CWnd*)
    AfxSig_vwWb,        // void (UINT, CWnd*, BOOL)
    AfxSig_vwwW,        // void (UINT, UINT, CWnd*)
    AfxSig_vs,          // void (LPSTR)
    AfxSig_vOWNER,      // void (int, LPSTR), force return TRUE
    AfxSig_iis,         // int (int, LPSTR)
    AfxSig_wp,          // UINT (CPoint)
    AfxSig_wv,          // UINT (void)
    AfxSig_vPOS,        // void (WINDOWPOS FAR*)
    AfxSig_vCALC,       // void (NCCALCSIZE_PARAMS FAR*)

// signatures specific to CCmdTarget
    AfxSig_vbx,         // void (UINT, int, CVBControl*, LPVOID)
    AfxSig_cmdui,       // void (CCmdUI*)
    AfxSig_vpv,         // void (void*)
    AfxSig_bpv,         // BOOL (void*)

// Other aliases (based on implementation)
    AfxSig_vwwh = AfxSig_vwww,  // void (UINT, UINT, HANDLE)
    AfxSig_vwp = AfxSig_vwl,    // void (UINT, CPoint)
    AfxSig_bw = AfxSig_bb,      // BOOL (UINT)
    AfxSig_bh = AfxSig_bb,      // BOOL (HANDLE)
    AfxSig_bv = AfxSig_wv,      // BOOL (void)
    AfxSig_hv = AfxSig_wv,      // HANDLE (void)
    AfxSig_vb = AfxSig_vw,      // void (BOOL)
    AfxSig_vbh = AfxSig_vww,    // void (BOOL, HANDLE)
    AfxSig_vbw = AfxSig_vww,    // void (BOOL, UINT)
    AfxSig_vhh = AfxSig_vww,    // void (HANDLE, HANDLE)
    AfxSig_vh = AfxSig_vw       // void (HANDLE)
};

////////////////////////////////////////////////////////////////////////
// Command notifications for CCmdTarget notifications define CN_COMMAND              0           // void ()
define CN_UPDATE_COMMAND_UI    (-1)        // void (CCmdUI*)
// > 0 are control notifications
```

```
#define ON_COMMAND(id, memberFxn) \
    { CN_COMMAND, id, AfxSig_vv, (AFX_PMSG)memberFxn },
        // ON_COMMAND(id, OnFoo) is the same as
        //   ON_CONTROL(0, id, OnFoo) or ON_BN_CLICKED(0, id, OnFoo)

#define ON_COMMAND_EX(id, memberFxn) \
    { CN_COMMAND, id, AfxSig_bw, \
        (AFX_PMSG)(BOOL (AFX_MSG_CALL CCmdTarget::*)(UINT))memberFxn }, define ON_UPDATE_COMMAND_UI(id, memberFxn) \
    { CN_UPDATE_COMMAND_UI, id, AfxSig_cmdui, \
        (AFX_PMSG)(void (AFX_MSG_CALL CCmdTarget::*)(CCmdUI*))memberFxn }, // for general controls
define ON_CONTROL(wNotifyCode, id, memberFxn) \
    { wNotifyCode, id, AfxSig_vv, (AFX_PMSG)memberFxn }, ///////////////////////////////////////////////////////////////////////
// Message map tables for Windows messages define ON_WM_CREATE() \
    { WM_CREATE, 0, AfxSig_is, \
        (AFX_PMSG)(AFX_PMSGW)(int (AFX_MSG_CALL CWnd::*)(LPCREATESTRUCT))OnCreate },
#define ON_WM_DESTROY() \
    { WM_DESTROY, 0, AfxSig_vv, \
        (AFX_PMSG)(AFX_PMSGW)(void (AFX_MSG_CALL CWnd::*)(void))OnDestroy },
#define ON_WM_MOVE() \
    { WM_MOVE, 0, AfxSig_vvii, \
        (AFX_PMSG)(AFX_PMSGW)(void (AFX_MSG_CALL CWnd::*)(int, int))OnMove },
#define ON_WM_SIZE() \
    { WM_SIZE, 0, AfxSig_vwii, \
        (AFX_PMSG)(AFX_PMSGW)(void (AFX_MSG_CALL CWnd::*)(UINT, int, int))OnSize },
#define ON_WM_ACTIVATE() \
    { WM_ACTIVATE, 0, AfxSig_vwWb, \
        (AFX_PMSG)(AFX_PMSGW)(void (AFX_MSG_CALL CWnd::*)(UINT, CWnd*, BOOL))OnActivate },
#define ON_WM_SETFOCUS() \
    { WM_SETFOCUS, 0, AfxSig_vW, \
        (AFX_PMSG)(AFX_PMSGW)(void (AFX_MSG_CALL CWnd::*)(CWnd*))OnSetFocus },
#define ON_WM_KILLFOCUS() \
    { WM_KILLFOCUS, 0, AfxSig_vW, \
        (AFX_PMSG)(AFX_PMSGW)(void (AFX_MSG_CALL CWnd::*)(CWnd*))OnKillFocus },
#define ON_WM_ENABLE() \
    { WM_ENABLE, 0, AfxSig_vb, \
        (AFX_PMSG)(AFX_PMSGW)(void (AFX_MSG_CALL CWnd::*)(BOOL))OnEnable },
#define ON_WM_PAINT() \
    { WM_PAINT, 0, AfxSig_vv, \
        (AFX_PMSG)(AFX_PMSGW)(void (AFX_MSG_CALL CWnd::*)(void))OnPaint },
#define ON_WM_CLOSE() \
    { WM_CLOSE, 0, AfxSig_vv, \
        (AFX_PMSG)(AFX_PMSGW)(void (AFX_MSG_CALL CWnd::*)(void))OnClose },
#define ON_WM_QUERYENDSESSION() \
    { WM_QUERYENDSESSION, 0, AfxSig_bv, \
        (AFX_PMSG)(AFX_PMSGW)(BOOL (AFX_MSG_CALL CWnd::*)(void))OnQueryEndSession },
#define ON_WM_QUERYOPEN() \
    { WM_QUERYOPEN, 0, AfxSig_bv, \
        (AFX_PMSG)(AFX_PMSGW)(BOOL (AFX_MSG_CALL CWnd::*)(void))OnQueryOpen },
#define ON_WM_ERASEBKGND() \
    { WM_ERASEBKGND, 0, AfxSig_bD, \
        (AFX_PMSG)(AFX_PMSGW)(BOOL (AFX_MSG_CALL CWnd::*)(CDC*))OnEraseBkgnd },
#define ON_WM_SYSCOLORCHANGE() \
    { WM_SYSCOLORCHANGE, 0, AfxSig_vv, \
        (AFX_PMSG)(AFX_PMSGW)(void (AFX_MSG_CALL CWnd::*)(void))OnSysColorChange },
#define ON_WM_ENDSESSION() \
    { WM_ENDSESSION, 0, AfxSig_vb, \
        (AFX_PMSG)(AFX_PMSGW)(void (AFX_MSG_CALL CWnd::*)(BOOL))OnEndSession },
#define ON_WM_SHOWWINDOW() \
    { WM_SHOWWINDOW, 0, AfxSig_vbw, \
        (AFX_PMSG)(AFX_PMSGW)(void (AFX_MSG_CALL CWnd::*)(BOOL, UINT))OnShowWindow },
#define ON_WM_CTLCOLOR() \
    { WM_CTLCOLOR, 0, AfxSig_hDWw, \
        (AFX_PMSG)(AFX_PMSGW)(HBRUSH (AFX_MSG_CALL CWnd::*)(CDC*, CWnd*, UINT))OnCtlColor },
#define ON_WM_WININICHANGE() \
    { WM_WININICHANGE, 0, AfxSig_vs, \
        (AFX_PMSG)(AFX_PMSGW)(void (AFX_MSG_CALL CWnd::*)(LPCSTR))OnWinIniChange },
#define ON_WM_DEVMODECHANGE() \
    { WM_DEVMODECHANGE, 0, AfxSig_vs, \
        (AFX_PMSG)(AFX_PMSGW)(void (AFX_MSG_CALL CWnd::*)(LPSTR))OnDevModeChange },
#define ON_WM_ACTIVATEAPP() \
    { WM_ACTIVATEAPP, 0, AfxSig_vbh, \
        (AFX_PMSG)(AFX_PMSGW)(void (AFX_MSG_CALL CWnd::*)(BOOL, HTASK))OnActivateApp },
#define ON_WM_FONTCHANGE() \
    { WM_FONTCHANGE, 0, AfxSig_vv, \
        (AFX_PMSG)(AFX_PMSGW)(void (AFX_MSG_CALL CWnd::*)(void))OnFontChange },
```

```
#define ON_WM_TIMECHANGE() \
    { WM_TIMECHANGE, 0, AfxSig_vv, \
        (AFX_PMSG)(AFX_PMSGW)(void (AFX_MSG_CALL CWnd::*)(void))OnTimeChange },
#define ON_WM_CANCELMODE() \
    { WM_CANCELMODE, 0, AfxSig_vv, \
        (AFX_PMSG)(AFX_PMSGW)(void (AFX_MSG_CALL CWnd::*)(void))OnCancelMode },
#define ON_WM_SETCURSOR() \
    { WM_SETCURSOR, 0, AfxSig_bWww, \
        (AFX_PMSG)(AFX_PMSGW)(BOOL (AFX_MSG_CALL CWnd::*)(CWnd*, UINT, UINT))OnSetCursor },
#define ON_WM_MOUSEACTIVATE() \
    { WM_MOUSEACTIVATE, 0, AfxSig_iWww, \
        (AFX_PMSG)(AFX_PMSGW)(int (AFX_MSG_CALL CWnd::*)(CWnd*, UINT, UINT))OnMouseActivate },
#define ON_WM_CHILDACTIVATE() \
    { WM_CHILDACTIVATE, 0, AfxSig_vv, \
        (AFX_PMSG)(AFX_PMSGW)(void (AFX_MSG_CALL CWnd::*)(void))OnChildActivate },
#define ON_WM_GETMINMAXINFO() \
    { WM_GETMINMAXINFO, 0, AfxSig_vs, \
        (AFX_PMSG)(AFX_PMSGW)(void (AFX_MSG_CALL CWnd::*)(MINMAXINFO FAR*))OnGetMinMaxInfo },
#define ON_WM_ICONERASEBKGND() \
    { WM_ICONERASEBKGND, 0, AfxSig_vD, \
        (AFX_PMSG)(AFX_PMSGW)(void (AFX_MSG_CALL CWnd::*)(CDC*))OnIconEraseBkgnd },
#define ON_WM_SPOOLERSTATUS() \
    { WM_SPOOLERSTATUS, 0, AfxSig_vww, \
        (AFX_PMSG)(AFX_PMSGW)(void (AFX_MSG_CALL CWnd::*)(UINT, UINT))OnSpoolerStatus },
#define ON_WM_DRAWITEM() \
    { WM_DRAWITEM, 0, AfxSig_vOWNER, \
        (AFX_PMSG)(AFX_PMSGW)(void (AFX_MSG_CALL CWnd::*)(int, LPDRAWITEMSTRUCT))OnDrawItem },
#define ON_WM_MEASUREITEM() \
    { WM_MEASUREITEM, 0, AfxSig_vOWNER, \
        (AFX_PMSG)(AFX_PMSGW)(void (AFX_MSG_CALL CWnd::*)(int, LPMEASUREITEMSTRUCT))OnMeasureItem },
#define ON_WM_DELETEITEM() \
    { WM_DELETEITEM, 0, AfxSig_vOWNER, \
        (AFX_PMSG)(AFX_PMSGW)(void (AFX_MSG_CALL CWnd::*)(int, LPDELETEITEMSTRUCT))OnDeleteItem },
#define ON_WM_CHARTOITEM() \
    { WM_CHARTOITEM, 0, AfxSig_iwWw, \
        (AFX_PMSG)(AFX_PMSGW)(int (AFX_MSG_CALL CWnd::*)(UINT, CListBox*, UINT))OnCharToItem },
#define ON_WM_VKEYTOITEM() \
    { WM_VKEYTOITEM, 0, AfxSig_iwWw, \
        (AFX_PMSG)(AFX_PMSGW)(int (AFX_MSG_CALL CWnd::*)(UINT, CListBox*, UINT))OnVKeyToItem },
#define ON_WM_QUERYDRAGICON() \
    { WM_QUERYDRAGICON, 0, AfxSig_hv, \
        (AFX_PMSG)(AFX_PMSGW)(HCURSOR (AFX_MSG_CALL CWnd::*)())OnQueryDragIcon },
#define ON_WM_COMPAREITEM() \
    { WM_COMPAREITEM, 0, AfxSig_iis, \
        (AFX_PMSG)(AFX_PMSGW)(int (AFX_MSG_CALL CWnd::*)(int, LPCOMPAREITEMSTRUCT))OnCompareItem },
#define ON_WM_COMPACTING() \
    { WM_COMPACTING, 0, AfxSig_vw, \
        (AFX_PMSG)(AFX_PMSGW)(void (AFX_MSG_CALL CWnd::*)(UINT))OnCompacting },
#define ON_WM_NCCREATE() \
    { WM_NCCREATE, 0, AfxSig_is, \
        (AFX_PMSG)(AFX_PMSGW)(BOOL (AFX_MSG_CALL CWnd::*)(LPCREATESTRUCT))OnNcCreate },
#define ON_WM_NCDESTROY() \
    { WM_NCDESTROY, 0, AfxSig_vv, \
        (AFX_PMSG)(AFX_PMSGW)(void (AFX_MSG_CALL CWnd::*)(void))OnNcDestroy },
#define ON_WM_NCCALCSIZE() \
    { WM_NCCALCSIZE, 0, AfxSig_vCALC, \
        (AFX_PMSG)(AFX_PMSGW)(void (AFX_MSG_CALL CWnd::*)(BOOL, NCCALCSIZE_PARAMS FAR*))OnNcCalcSize },
#define ON_WM_NCHITTEST() \
    { WM_NCHITTEST, 0, AfxSig_wp, \
        (AFX_PMSG)(AFX_PMSGW)(UINT (AFX_MSG_CALL CWnd::*)(CPoint))OnNcHitTest },
#define ON_WM_NCPAINT() \
    { WM_NCPAINT, 0, AfxSig_vv, \
        (AFX_PMSG)(AFX_PMSGW)(void (AFX_MSG_CALL CWnd::*)(void))OnNcPaint },
#define ON_WM_NCACTIVATE() \
    { WM_NCACTIVATE, 0, AfxSig_bb, \
        (AFX_PMSG)(AFX_PMSGW)(BOOL (AFX_MSG_CALL CWnd::*)(BOOL))OnNcActivate },
#define ON_WM_GETDLGCODE() \
    { WM_GETDLGCODE, 0, AfxSig_wv, \
        (AFX_PMSG)(AFX_PMSGW)(UINT (AFX_MSG_CALL CWnd::*)(void))OnGetDlgCode },
#define ON_WM_NCMOUSEMOVE() \
    { WM_NCMOUSEMOVE, 0, AfxSig_vwp, \
        (AFX_PMSG)(AFX_PMSGW)(void (AFX_MSG_CALL CWnd::*)(UINT, CPoint))OnNcMouseMove },
#define ON_WM_NCLBUTTONDOWN() \
    { WM_NCLBUTTONDOWN, 0, AfxSig_vwp, \
        (AFX_PMSG)(AFX_PMSGW)(void (AFX_MSG_CALL CWnd::*)(UINT, CPoint))OnNcLButtonDown },
#define ON_WM_NCLBUTTONUP() \
    { WM_NCLBUTTONUP, 0, AfxSig_vwp, \
        (AFX_PMSG)(AFX_PMSGW)(void (AFX_MSG_CALL CWnd::*)(UINT, CPoint))OnNcLButtonUp },
#define ON_WM_NCLBUTTONDBLCLK() \
    { WM_NCLBUTTONDBLCLK, 0, AfxSig_vwp, \
        (AFX_PMSG)(AFX_PMSGW)(void (AFX_MSG_CALL CWnd::*)(UINT, CPoint))OnNcLButtonDblClk },
#define ON_WM_NCRBUTTONDOWN() \
```

```
        { WM_NCRBUTTONDOWN, 0, AfxSig_vwp, \
            (AFX_PMSG)(AFX_PMSGW)(void (AFX_MSG_CALL CWnd::*)(UINT, CPoint))OnNcRButtonDown },
#define ON_WM_NCRBUTTONUP() \
        { WM_NCRBUTTONUP, 0, AfxSig_vwp, \
            (AFX_PMSG)(AFX_PMSGW)(void (AFX_MSG_CALL CWnd::*)(UINT, CPoint))OnNcRButtonUp },
#define ON_WM_NCRBUTTONDBLCLK() \
        { WM_NCRBUTTONDBLCLK, 0, AfxSig_vwp, \
            (AFX_PMSG)(AFX_PMSGW)(void (AFX_MSG_CALL CWnd::*)(UINT, CPoint))OnNcRButtonDblClk },
#define ON_WM_NCMBUTTONDOWN() \
        { WM_NCMBUTTONDOWN, 0, AfxSig_vwp, \
            (AFX_PMSG)(AFX_PMSGW)(void (AFX_MSG_CALL CWnd::*)(UINT, CPoint))OnNcMButtonDown },
#define ON_WM_NCMBUTTONUP() \
        { WM_NCMBUTTONUP, 0, AfxSig_vwp, \
            (AFX_PMSG)(AFX_PMSGW)(void (AFX_MSG_CALL CWnd::*)(UINT, CPoint))OnNcMButtonUp },
#define ON_WM_NCMBUTTONDBLCLK() \
        { WM_NCMBUTTONDBLCLK, 0, AfxSig_vwp, \
            (AFX_PMSG)(AFX_PMSGW)(void (AFX_MSG_CALL CWnd::*)(UINT, CPoint))OnNcMButtonDblClk },
#define ON_WM_KEYDOWN() \
        { WM_KEYDOWN, 0, AfxSig_vwww, \
            (AFX_PMSG)(AFX_PMSGW)(void (AFX_MSG_CALL CWnd::*)(UINT, UINT, UINT))OnKeyDown },
#define ON_WM_KEYUP() \
        { WM_KEYUP, 0, AfxSig_vwww, \
            (AFX_PMSG)(AFX_PMSGW)(void (AFX_MSG_CALL CWnd::*)(UINT, UINT, UINT))OnKeyUp },
#define ON_WM_CHAR() \
        { WM_CHAR, 0, AfxSig_vwww, \
            (AFX_PMSG)(AFX_PMSGW)(void (AFX_MSG_CALL CWnd::*)(UINT, UINT, UINT))OnChar },
#define ON_WM_DEADCHAR() \
        { WM_DEADCHAR, 0, AfxSig_vwww, \
            (AFX_PMSG)(AFX_PMSGW)(void (AFX_MSG_CALL CWnd::*)(UINT, UINT, UINT))OnDeadChar },
#define ON_WM_SYSKEYDOWN() \
        { WM_SYSKEYDOWN, 0, AfxSig_vwww, \
            (AFX_PMSG)(AFX_PMSGW)(void (AFX_MSG_CALL CWnd::*)(UINT, UINT, UINT))OnSysKeyDown },
#define ON_WM_SYSKEYUP() \
        { WM_SYSKEYUP, 0, AfxSig_vwww, \
            (AFX_PMSG)(AFX_PMSGW)(void (AFX_MSG_CALL CWnd::*)(UINT, UINT, UINT))OnSysKeyUp },
#define ON_WM_SYSCHAR() \
        { WM_SYSCHAR, 0, AfxSig_vwww, \
            (AFX_PMSG)(AFX_PMSGW)(void (AFX_MSG_CALL CWnd::*)(UINT, UINT, UINT))OnSysChar },
#define ON_WM_SYSDEADCHAR() \
        { WM_SYSDEADCHAR, 0, AfxSig_vwww, \
            (AFX_PMSG)(AFX_PMSGW)(void (AFX_MSG_CALL CWnd::*)(UINT, UINT, UINT))OnSysDeadChar },
#define ON_WM_SYSCOMMAND() \
        { WM_SYSCOMMAND, 0, AfxSig_vwl, \
            (AFX_PMSG)(AFX_PMSGW)(void (AFX_MSG_CALL CWnd::*)(UINT, LPARAM))OnSysCommand },
#define ON_WM_TIMER() \
        { WM_TIMER, 0, AfxSig_vw, \
            (AFX_PMSG)(AFX_PMSGW)(void (AFX_MSG_CALL CWnd::*)(UINT))OnTimer },
#define ON_WM_HSCROLL() \
        { WM_HSCROLL, 0, AfxSig_vwwW, \
            (AFX_PMSG)(AFX_PMSGW)(void (AFX_MSG_CALL CWnd::*)(UINT, UINT, CScrollBar*))OnHScroll },
#define ON_WM_VSCROLL() \
        { WM_VSCROLL, 0, AfxSig_vwwW, \
            (AFX_PMSG)(AFX_PMSGW)(void (AFX_MSG_CALL CWnd::*)(UINT, UINT, CScrollBar*))OnVScroll },
#define ON_WM_INITMENU() \
        { WM_INITMENU, 0, AfxSig_vM, \
            (AFX_PMSG)(AFX_PMSGW)(void (AFX_MSG_CALL CWnd::*)(CMenu*))OnInitMenu },
#define ON_WM_INITMENUPOPUP() \
        { WM_INITMENUPOPUP, 0, AfxSig_vMwb, \
            (AFX_PMSG)(AFX_PMSGW)(void (AFX_MSG_CALL CWnd::*)(CMenu*, UINT, BOOL))OnInitMenuPopup },
#define ON_WM_MENUSELECT() \
        { WM_MENUSELECT, 0, AfxSig_vwwh, \
            (AFX_PMSG)(AFX_PMSGW)(void (AFX_MSG_CALL CWnd::*)(UINT, UINT, HMENU))OnMenuSelect },
#define ON_WM_MENUCHAR() \
        { WM_MENUCHAR, 0, AfxSig_lwwM, \
            (AFX_PMSG)(AFX_PMSGW)(LRESULT (AFX_MSG_CALL CWnd::*)(UINT, UINT, CMenu*))OnMenuChar },
#define ON_WM_ENTERIDLE() \
        { WM_ENTERIDLE, 0, AfxSig_vwW, \
            (AFX_PMSG)(AFX_PMSGW)(void (AFX_MSG_CALL CWnd::*)(UINT, CWnd*))OnEnterIdle },
#define ON_WM_MOUSEMOVE() \
        { WM_MOUSEMOVE, 0, AfxSig_vwp, \
            (AFX_PMSG)(AFX_PMSGW)(void (AFX_MSG_CALL CWnd::*)(UINT, CPoint))OnMouseMove },
#define ON_WM_LBUTTONDOWN() \
        { WM_LBUTTONDOWN, 0, AfxSig_vwp, \
            (AFX_PMSG)(AFX_PMSGW)(void (AFX_MSG_CALL CWnd::*)(UINT, CPoint))OnLButtonDown },
#define ON_WM_LBUTTONUP() \
        { WM_LBUTTONUP, 0, AfxSig_vwp, \
            (AFX_PMSG)(AFX_PMSGW)(void (AFX_MSG_CALL CWnd::*)(UINT, CPoint))OnLButtonUp },
#define ON_WM_LBUTTONDBLCLK() \
        { WM_LBUTTONDBLCLK, 0, AfxSig_vwp, \
            (AFX_PMSG)(AFX_PMSGW)(void (AFX_MSG_CALL CWnd::*)(UINT, CPoint))OnLButtonDblClk },
#define ON_WM_RBUTTONDOWN() \
        { WM_RBUTTONDOWN, 0, AfxSig_vwp, \
            (AFX_PMSG)(AFX_PMSGW)(void (AFX_MSG_CALL CWnd::*)(UINT, CPoint))OnRButtonDown },
```

```c
#define ON_WM_RBUTTONUP() \
    { WM_RBUTTONUP, 0, AfxSig_vwp, \
        (AFX_PMSG)(AFX_PMSGW)(void (AFX_MSG_CALL CWnd::*)(UINT, CPoint))OnRButtonUp },
#define ON_WM_RBUTTONDBLCLK() \
    { WM_RBUTTONDBLCLK, 0, AfxSig_vwp, \
        (AFX_PMSG)(AFX_PMSGW)(void (AFX_MSG_CALL CWnd::*)(UINT, CPoint))OnRButtonDblClk },
#define ON_WM_MBUTTONDOWN() \
    { WM_MBUTTONDOWN, 0, AfxSig_vwp, \
        (AFX_PMSG)(AFX_PMSGW)(void (AFX_MSG_CALL CWnd::*)(UINT, CPoint))OnMButtonDown },
#define ON_WM_MBUTTONUP() \
    { WM_MBUTTONUP, 0, AfxSig_vwp, \
        (AFX_PMSG)(AFX_PMSGW)(void (AFX_MSG_CALL CWnd::*)(UINT, CPoint))OnMButtonUp },
#define ON_WM_MBUTTONDBLCLK() \
    { WM_MBUTTONDBLCLK, 0, AfxSig_vwp, \
        (AFX_PMSG)(AFX_PMSGW)(void (AFX_MSG_CALL CWnd::*)(UINT, CPoint))OnMButtonDblClk },
#define ON_WM_PARENTNOTIFY() \
    { WM_PARENTNOTIFY, 0, AfxSig_vwl, \
        (AFX_PMSG)(AFX_PMSGW)(void (AFX_MSG_CALL CWnd::*)(UINT, LPARAM))OnParentNotify },
#define ON_WM_MDIACTIVATE() \
    { WM_MDIACTIVATE, 0, AfxSig_vbWW, \
        (AFX_PMSG)(AFX_PMSGW)(void (AFX_MSG_CALL CWnd::*)(BOOL, CWnd*, CWnd*))OnMDIActivate },
#define ON_WM_RENDERFORMAT() \
    { WM_RENDERFORMAT, 0, AfxSig_vw, \
        (AFX_PMSG)(AFX_PMSGW)(void (AFX_MSG_CALL CWnd::*)(UINT))OnRenderFormat },
#define ON_WM_RENDERALLFORMATS() \
    { WM_RENDERALLFORMATS, 0, AfxSig_vv, \
        (AFX_PMSG)(AFX_PMSGW)(void (AFX_MSG_CALL CWnd::*)(void))OnRenderAllFormats },
#define ON_WM_DESTROYCLIPBOARD() \
    { WM_DESTROYCLIPBOARD, 0, AfxSig_vv, \
        (AFX_PMSG)(AFX_PMSGW)(void (AFX_MSG_CALL CWnd::*)(void))OnDestroyClipboard },
#define ON_WM_DRAWCLIPBOARD() \
    { WM_DRAWCLIPBOARD, 0, AfxSig_vv, \
        (AFX_PMSG)(AFX_PMSGW)(void (AFX_MSG_CALL CWnd::*)(void))OnDrawClipboard },
#define ON_WM_PAINTCLIPBOARD() \
    { WM_PAINTCLIPBOARD, 0, AfxSig_vWh, \
        (AFX_PMSG)(AFX_PMSGW)(void (AFX_MSG_CALL CWnd::*)(CWnd*, HGLOBAL))OnPaintClipboard },
#define ON_WM_VSCROLLCLIPBOARD() \
    { WM_VSCROLLCLIPBOARD, 0, AfxSig_vWww, \
        (AFX_PMSG)(AFX_PMSGW)(void (AFX_MSG_CALL CWnd::*)(CWnd*, UINT, UINT))OnVScrollClipboard },
#define ON_WM_SIZECLIPBOARD() \
    { WM_SIZECLIPBOARD, 0, AfxSig_vWh, \
        (AFX_PMSG)(AFX_PMSGW)(void (AFX_MSG_CALL CWnd::*)(CWnd*, HGLOBAL))OnSizeClipboard },
#define ON_WM_ASKCBFORMATNAME() \
    { WM_ASKCBFORMATNAME, 0, AfxSig_vwl, \
        (AFX_PMSG)(AFX_PMSGW)(void (AFX_MSG_CALL CWnd::*)(UINT, LPSTR))OnAskCbFormatName },
#define ON_WM_CHANGECBCHAIN() \
    { WM_CHANGECBCHAIN, 0, AfxSig_vhh, \
        (AFX_PMSG)(AFX_PMSGW)(void (AFX_MSG_CALL CWnd::*)(HWND, HWND))OnChangeCbChain },
#define ON_WM_HSCROLLCLIPBOARD() \
    { WM_HSCROLLCLIPBOARD, 0, AfxSig_vWww, \
        (AFX_PMSG)(AFX_PMSGW)(void (AFX_MSG_CALL CWnd::*)(CWnd*, UINT, UINT))OnHScrollClipboard },
#define ON_WM_QUERYNEWPALETTE() \
    { WM_QUERYNEWPALETTE, 0, AfxSig_bv, \
        (AFX_PMSG)(AFX_PMSGW)(BOOL (AFX_MSG_CALL CWnd::*)(void))OnQueryNewPalette },
#define ON_WM_PALETTECHANGED() \
    { WM_PALETTECHANGED, 0, AfxSig_vW, \
        (AFX_PMSG)(AFX_PMSGW)(void (AFX_MSG_CALL CWnd::*)(CWnd*))OnPaletteChanged }, if (WINVER >= 0x030a)
define ON_WM_PALETTEISCHANGING() \
    { WM_PALETTEISCHANGING, 0, AfxSig_vW, \
        (AFX_PMSG)(AFX_PMSGW)(void (AFX_MSG_CALL CWnd::*)(CWnd*))OnPaletteIsChanging },
#define ON_WM_DROPFILES() \
    { WM_DROPFILES, 0, AfxSig_vh, \
        (AFX_PMSG)(AFX_PMSGW)(void (AFX_MSG_CALL CWnd::*)(HDROP))OnDropFiles },
#define ON_WM_WINDOWPOSCHANGING() \
    { WM_WINDOWPOSCHANGING, 0, AfxSig_vPOS, \
        (AFX_PMSG)(AFX_PMSGW)(void (AFX_MSG_CALL CWnd::*)(WINDOWPOS FAR*))OnWindowPosChanging },
#define ON_WM_WINDOWPOSCHANGED() \
    { WM_WINDOWPOSCHANGED, 0, AfxSig_vPOS, \
        (AFX_PMSG)(AFX_PMSGW)(void (AFX_MSG_CALL CWnd::*)(WINDOWPOS FAR*))OnWindowPosChanged },
endif /////////////////////////////////////////////////////////////////////////////
// Message map tables for Control Notification messages // Edit Control Notification Codes
define ON_EN_SETFOCUS(id, memberFxn) \
    ON_CONTROL(EN_SETFOCUS, id, memberFxn)
#define ON_EN_KILLFOCUS(id, memberFxn) \
    ON_CONTROL(EN_KILLFOCUS, id, memberFxn)
#define ON_EN_CHANGE(id, memberFxn) \
    ON_CONTROL(EN_CHANGE, id, memberFxn)
```

```
#define ON_EN_UPDATE(id, memberFxn) \
    ON_CONTROL(EN_UPDATE, id, memberFxn)
#define ON_EN_ERRSPACE(id, memberFxn) \
    ON_CONTROL(EN_ERRSPACE, id, memberFxn)
#define ON_EN_MAXTEXT(id, memberFxn) \
    ON_CONTROL(EN_MAXTEXT, id, memberFxn)
#define ON_EN_HSCROLL(id, memberFxn) \
    ON_CONTROL(EN_HSCROLL, id, memberFxn)
#define ON_EN_VSCROLL(id, memberFxn) \
    ON_CONTROL(EN_VSCROLL, id, memberFxn)

// User Button Notification Codes
#define ON_BN_CLICKED(id, memberFxn) \
    ON_CONTROL(BN_CLICKED, id, memberFxn)
#define ON_BN_DOUBLECLICKED(id, memberFxn) \
    ON_CONTROL(BN_DOUBLECLICKED, id, memberFxn)

#if (WINVER < 0x030a)
// old BS_USERBUTTON button notifications - obsolete in Win31
#define ON_BN_PAINT(id, memberFxn) \
    ON_CONTROL(BN_PAINT, id, memberFxn)
#define ON_BN_HILITE(id, memberFxn) \
    ON_CONTROL(BN_HILITE, id, memberFxn)
#define ON_BN_UNHILITE(id, memberFxn) \
    ON_CONTROL(BN_UNHILITE, id, memberFxn)
#define ON_BN_DISABLE(id, memberFxn) \
    ON_CONTROL(BN_DISABLE, id, memberFxn)
endif //-Listbox Notification Codes
define ON_LBN_ERRSPACE(id, memberFxn) \
    ON_CONTROL(LBN_ERRSPACE, id, memberFxn)
#define ON_LBN_SELCHANGE(id, memberFxn) \
    ON_CONTROL(LBN_SELCHANGE, id, memberFxn)
#define ON_LBN_DBLCLK(id, memberFxn) \
    ON_CONTROL(LBN_DBLCLK, id, memberFxn)
#define ON_LBN_SELCANCEL(id, memberFxn) \
    ON_CONTROL(LBN_SELCANCEL, id, memberFxn)
#define ON_LBN_SETFOCUS(id, memberFxn) \
    ON_CONTROL(LBN_SETFOCUS, id, memberFxn)
#define ON_LBN_KILLFOCUS(id, memberFxn) \
    ON_CONTROL(LBN_KILLFOCUS, id, memberFxn)

// Combo Box Notification Codes
#define ON_CBN_ERRSPACE(id, memberFxn) \
    ON_CONTROL(CBN_ERRSPACE, id, memberFxn)
#define ON_CBN_SELCHANGE(id, memberFxn) \
    ON_CONTROL(CBN_SELCHANGE, id, memberFxn)
#define ON_CBN_DBLCLK(id, memberFxn) \
    ON_CONTROL(CBN_DBLCLK, id, memberFxn)
#define ON_CBN_SETFOCUS(id, memberFxn) \
    ON_CONTROL(CBN_SETFOCUS, id, memberFxn)
#define ON_CBN_KILLFOCUS(id, memberFxn) \
    ON_CONTROL(CBN_KILLFOCUS, id, memberFxn)
#define ON_CBN_EDITCHANGE(id, memberFxn) \
    ON_CONTROL(CBN_EDITCHANGE, id, memberFxn)
#define ON_CBN_EDITUPDATE(id, memberFxn) \
    ON_CONTROL(CBN_EDITUPDATE, id, memberFxn)
#define ON_CBN_DROPDOWN(id, memberFxn) \

// global for last state of call to 'WindowProc'
MSG NEAR _afxLastMsg;       // shared global with modal usage ////////////////////////////////////////////////////////////////////////////
// Official way to send message to a CWnd LRESULT PASCAL _AfxCallWndProc(CWnd* pWnd, HWND hWnd, UINT message,
    WPARAM wParam, LPARAM lParam)
{
    LRESULT lResult;
    MSG oldState = _afxLastMsg;    // save for nesting _afxLastMsg.hwnd = hWnd;
    _afxLastMsg.message = message;
    _afxLastMsg.wParam = wParam;
    _afxLastMsg.lParam = lParam;

#ifdef _DEBUG
    if (afxTraceFlags & 4)
        _AfxTraceMsg("WndProc", &_afxLastMsg);
```

```
#endif

// Catch exceptions thrown outside the scope of a callback
        // in debug builds and warn the user.
        TRY
        {
                lResult = pWnd->WindowProc(message, wParam, lParam);
        }
        CATCH_ALL(e)
        {
                lResult = AfxGetApp()->ProcessWndProcException(e, &_afxLastMsg);
                TRACE1("Warning: Uncaught exception in WindowProc (returning %ld)\n",
                        lResult);
        }
        END_CATCH_ALL _afxLastMsg = oldState;
        return lResult;
}

/////////////////////////////////////////////////////////////////////////////
// One main WndProc for all CWnd's and derived classes ON_CONTROL(CBN_DROPDOWN, id, memberFxn)
if (WINVER >= 0x030a)
#define ON_CBN_CLOSEUP(id, memberFxn) \
        ON_CONTROL(CBN_CLOSEUP, id, memberFxn)
#define ON_CBN_SELENDOK(id, memberFxn) \
        ON_CONTROL(CBN_SELENDOK, id, memberFxn)
#define ON_CBN_SELENDCANCEL(id, memberFxn) \
        ON_CONTROL(CBN_SELENDCANCEL, id, memberFxn)
endif /////////////////////////////////////////////////////////////////////////////
// User extensions for message map entries // for Windows messages
define ON_MESSAGE(message, memberFxn) \
        { message, 0, AfxSig_lwl, \
                (AFX_PMSG)(AFX_PMSGW)(LRESULT (AFX_MSG_CALL CWnd::*)(WPARAM, LPARAM))memberFxn }, // for Registered Windows messages
define ON_REGISTERED_MESSAGE(nMessageVariable, memberFxn) \
        { 0xC000, 0, (UINT)(UINT NEAR*)(&nMessageVariable), \
                /*implied 'AfxSig_lwl'*/ \
                (AFX_PMSG)(AFX_PMSGW)(LRESULT (AFX_MSG_CALL CWnd::*)(WPARAM, LPARAM))memberFxn }, /////////////////////////////////////////////////////////////////////////////
// Routed VBX Event message // for VBX control events
define ON_VBXEVENT(wNotifyCode, id, memberFxn) \
        { 0xC001, id, &wNotifyCode, \
                (AFX_PMSG)(void (AFX_MSG_CALL CCmdTarget::*)(UINT, int, CWnd*, LPVOID))memberFxn }, /////////////////////////////////////////////////////////////////////////////
```

*APPENDIX B*

```
// Microsoft Foundation Classes C++ library.
// Copyright (C) 1992 Microsoft Corporation,
// All rights reserved.

// This source code is only intended as a supplement to the
// Microsoft Foundation Classes Reference and Microsoft
// QuickHelp and/or WinHelp documentation provided with the library.
// See these sources for detailed information regarding the
// Microsoft Foundation Classes product.

/////////////////////////////////////////////////////////////////////////////
// Window message map handling struct AFX_MSGMAP_ENTRY;      // declared below after CWnd struct AFXAPI_DATA_TYPE AFX_MSGMAP
{
        AFX_MSGMAP* pBaseMessageMap;
        AFX_MSGMAP_ENTRY FAR* lpEntries;
};
```

```
#define DECLARE_MESSAGE_MAP() \
private: \
        static AFX_MSGMAP_ENTRY BASED_CODE _messageEntries[]; \
protected: \
        static AFX_MSGMAP AFXAPP_DATA messageMap; \
        virtual AFX_MSGMAP* GetMessageMap() const;

#define BEGIN_MESSAGE_MAP(theClass, baseClass) \
        AFX_MSGMAP* theClass::GetMessageMap() const \
                { return &theClass::messageMap; } \
        AFX_MSGMAP AFXAPP_DATA theClass::messageMap = \
        { &(baseClass::messageMap), \
                (AFX_MSGMAP_ENTRY FAR*) &(theClass::_messageEntries) }; \
        AFX_MSGMAP_ENTRY BASED_CODE theClass::_messageEntries[] = \
        { define END_MESSAGE_MAP() \
        { 0, 0, AfxSig_end, (AFX_PMSG)0 } \
        };

// Message map signature values and macros in separate header
#include "afxmsg_.h"

/////////////////////////////////////////////////////////////////////////////

// CWnd implementation

// pointer to afx_msg member function
#ifndef AFX_MSG_CALL
#define AFX_MSG_CALL PASCAL
#endif
typedef void (AFX_MSG_CALL CCmdTarget::*AFX_PMSG)(void);

struct AFX_MSGMAP_ENTRY
{
        UINT nMessage;  // windows message or control notification code
        UINT nID;       // control ID (or 0 for windows messages)
        UINT nSig;      // signature type (action) or near pointer to message #
        AFX_PMSG pfn;   // routine to call (or special value)
};

/////////////////////////////////////////////////////////////////////////////
// CWnd - a Microsoft Windows application window class CWnd : public CCmdTarget
{
        DECLARE_DYNCREATE(CWnd)

// Attributes
public:
        HWND m_hWnd;             // must be first data member // Window-Management message handler member functions
protected:
        virtual BOOL OnCommand(WPARAM wParam, LPARAM lParam);

afx_msg void OnActivate(UINT nState, CWnd* pWndOther, BOOL bMinimized);
        afx_msg void OnActivateApp(BOOL bActive, HTASK hTask);
        afx_msg void OnCancelMode();
        afx_msg void OnChildActivate();
        afx_msg void OnClose();
        afx_msg int OnCreate(LPCREATESTRUCT lpCreateStruct);

afx_msg HBRUSH OnCtlColor(CDC* pDC, CWnd* pWnd, UINT nCtlColor);

afx_msg void OnDestroy();
        afx_msg void OnEnable(BOOL bEnable);
        afx_msg void OnEndSession(BOOL bEnding);
        afx_msg void OnEnterIdle(UINT nWhy, CWnd* pWho);
        afx_msg BOOL OnEraseBkgnd(CDC* pDC);
        afx_msg void OnGetMinMaxInfo(MINMAXINFO FAR* lpMMI);
        afx_msg void OnIconEraseBkgnd(CDC* pDC);
        afx_msg void OnKillFocus(CWnd* pNewWnd);
        afx_msg LRESULT OnMenuChar(UINT nChar, UINT nFlags, CMenu* pMenu);
        afx_msg void OnMenuSelect(UINT nItemID, UINT nFlags, HMENU hSysMenu);
        afx_msg void OnMove(int x, int y);
        afx_msg void OnPaint();
        afx_msg void OnParentNotify(UINT message, LPARAM lParam);
        afx_msg HCURSOR OnQueryDragIcon();
        afx_msg BOOL OnQueryEndSession();
        afx_msg BOOL OnQueryNewPalette();
        afx_msg BOOL OnQueryOpen();
        afx_msg void OnSetFocus(CWnd* pOldWnd);
```

```
      afx_msg void OnShowWindow(BOOL bShow, UINT nStatus);
      afx_msg void OnSize(UINT nType, int cx, int cy);
#if (WINVER >= 0x030a)
      afx_msg void OnWindowPosChanging(WINDOWPOS FAR* lpwndpos);
      afx_msg void OnWindowPosChanged(WINDOWPOS FAR* lpwndpos);
endif // Nonclient-Area message handler member functions
      afx_msg BOOL OnNcActivate(BOOL bActive);
      afx_msg void OnNcCalcSize(BOOL bCalcValidRects, NCCALCSIZE_PARAMS FAR* lpncsp);
      afx_msg BOOL OnNcCreate(LPCREATESTRUCT lpCreateStruct);
      afx_msg void OnNcDestroy();
      afx_msg UINT OnNcHitTest(CPoint point);
      afx_msg void OnNcLButtonDblClk(UINT nHitTest, CPoint point);
      afx_msg void OnNcLButtonDown(UINT nHitTest, CPoint point);
      afx_msg void OnNcLButtonUp(UINT nHitTest, CPoint point);
      afx_msg void OnNcMButtonDblClk(UINT nHitTest, CPoint point);
      afx_msg void OnNcMButtonDown(UINT nHitTest, CPoint point);
      afx_msg void OnNcMButtonUp(UINT nHitTest, CPoint point);
      afx_msg void OnNcMouseMove(UINT nHitTest, CPoint point);
      afx_msg void OnNcPaint();
      afx_msg void OnNcRButtonDblClk(UINT nHitTest, CPoint point);
      afx_msg void OnNcRButtonDown(UINT nHitTest, CPoint point);
      afx_msg void OnNcRButtonUp(UINT nHitTest, CPoint point);

// System message handler member functions
#if (WINVER >= 0x030a)
      afx_msg void OnDropFiles(HDROP hDropInfo);
      afx_msg void OnPaletteIsChanging(CWnd* pRealizeWnd);
#endif
      afx_msg void OnSysChar(UINT nChar, UINT nRepCnt, UINT nFlags);
      afx_msg void OnSysCommand(UINT nID, LPARAM lParam);
      afx_msg void OnSysDeadChar(UINT nChar, UINT nRepCnt, UINT nFlags);
      afx_msg void OnSysKeyDown(UINT nChar, UINT nRepCnt, UINT nFlags);
      afx_msg void OnSysKeyUp(UINT nChar, UINT nRepCnt, UINT nFlags);
      afx_msg void OnCompacting(UINT nCpuTime);
      afx_msg void OnDevModeChange(LPSTR lpDeviceName);
      afx_msg void OnFontChange();
      afx_msg void OnPaletteChanged(CWnd* pFocusWnd);
      afx_msg void OnSpoolerStatus(UINT nStatus, UINT nJobs);
      afx_msg void OnSysColorChange();
      afx_msg void OnTimeChange();
      afx_msg void OnWinIniChange(LPCSTR lpszSection);

// Input message handler member functions
      afx_msg void OnChar(UINT nChar, UINT nRepCnt, UINT nFlags);
      afx_msg void OnDeadChar(UINT nChar, UINT nRepCnt, UINT nFlags);
      afx_msg void OnHScroll(UINT nSBCode, UINT nPos, CScrollBar* pScrollBar);
      afx_msg void OnVScroll(UINT nSBCode, UINT nPos, CScrollBar* pScrollBar);
      afx_msg void OnKeyDown(UINT nChar, UINT nRepCnt, UINT nFlags);
      afx_msg void OnKeyUp(UINT nChar, UINT nRepCnt, UINT nFlags);
      afx_msg void OnLButtonDblClk(UINT nFlags, CPoint point);
      afx_msg void OnLButtonDown(UINT nFlags, CPoint point);
      afx_msg void OnLButtonUp(UINT nFlags, CPoint point);
      afx_msg void OnMButtonDblClk(UINT nFlags, CPoint point);
      afx_msg void OnMButtonDown(UINT nFlags, CPoint point);
      afx_msg void OnMButtonUp(UINT nFlags, CPoint point);
      afx_msg int OnMouseActivate(CWnd* pDesktopWnd, UINT nHitTest, UINT message);
      afx_msg void OnMouseMove(UINT nFlags, CPoint point);
      afx_msg void OnRButtonDblClk(UINT nFlags, CPoint point);
      afx_msg void OnRButtonDown(UINT nFlags, CPoint point);
      afx_msg void OnRButtonUp(UINT nFlags, CPoint point);
      afx_msg BOOL OnSetCursor(CWnd* pWnd, UINT nHitTest, UINT message);
      afx_msg void OnTimer(UINT nIDEvent);

// Initialization message handler member functions
      afx_msg void OnInitMenu(CMenu* pMenu);
      afx_msg void OnInitMenuPopup(CMenu* pPopupMenu, UINT nIndex, BOOL bSysMenu);

// Clipboard message handler member functions
      afx_msg void OnAskCbFormatName(UINT nMaxCount, LPSTR lpszString);
      afx_msg void OnChangeCbChain(HWND hWndRemove, HWND hWndAfter);
      afx_msg void OnDestroyClipboard();
      afx_msg void OnDrawClipboard();
      afx_msg void OnHScrollClipboard(CWnd* pClipAppWnd, UINT nSBCode, UINT nPos);
      afx_msg void OnPaintClipboard(CWnd* pClipAppWnd, HGLOBAL hPaintStruct);
      afx_msg void OnRenderAllFormats();
      afx_msg void OnRenderFormat(UINT nFormat);
      afx_msg void OnSizeClipboard(CWnd* pClipAppWnd, HGLOBAL hRect);
      afx_msg void OnVScrollClipboard(CWnd* pClipAppWnd, UINT nSBCode, UINT nPos);

// Control message handler member functions
      afx_msg int OnCompareItem(int nIDCtl, LPCOMPAREITEMSTRUCT lpCompareItemStruct);
```

```
        afx_msg void OnDeleteItem(int nIDCtl, LPDELETEITEMSTRUCT lpDeleteItemStruct);
        afx_msg void OnDrawItem(int nIDCtl, LPDRAWITEMSTRUCT lpDrawItemStruct);
        afx_msg UINT OnGetDlgCode();
        afx_msg void OnMeasureItem(int nIDCtl, LPMEASUREITEMSTRUCT lpMeasureItemStruct);
        afx_msg int OnCharToItem(UINT nChar, CListBox* pListBox, UINT nIndex);
        afx_msg int OnVKeyToItem(UINT nKey, CListBox* pListBox, UINT nIndex);

// MDI message handler member functions
        afx_msg void OnMDIActivate(BOOL bActivate,
                    CWnd* pActivateWnd, CWnd* pDeactivateWnd);

// Overridables and other helpers (for implementation of derived classes)
protected:
        // for deriving from a standard control
        virtual WNDPROC* GetSuperWndProcAddr();

// for dialog data exchange and validation
        virtual void DoDataExchange(CDataExchange* pDX);

public:
        // for translating Windows messages in main message pump
        virtual BOOL PreTranslateMessage(MSG* pMsg);

protected:
        // for processing Windows messages
        virtual LRESULT WindowProc(UINT message, WPARAM wParam, LPARAM lParam);

// for handling default processing
        LRESULT Default();
        virtual LRESULT DefWindowProc(UINT message, WPARAM wParam, LPARAM lParam);

// for custom cleanup after WM_NCDESTROY
        virtual void PostNcDestroy();
        // for notifications from parent
        virtual BOOL OnChildNotify(UINT message, WPARAM wParam, LPARAM lParam,
                        LRESULT* pLResult);
                        // return TRUE if parent should not process this message // Implementation protected:
        // implementation of message routing
        friend LRESULT CALLBACK AFX_EXPORT _AfxSendMsgHook(int, WPARAM, LPARAM);
        friend LRESULT PASCAL _AfxCallWndProc(CWnd*, HWND, UINT, WPARAM, LPARAM);

//{{AFX_MSG(CWnd)
        //}}AFX_MSG
        DECLARE_MESSAGE_MAP()
};
```

*APPENDIX C*

```
// This is a part of the Microsoft Foundation Classes C++ library.
// Copyright (C) 1992 Microsoft Corporation
// All rights reserved.
//
// This source code is only intended as a supplement to the
// Microsoft Foundation Classes Reference and Microsoft
// QuickHelp and/or WinHelp documentation provided with the library.
// See these sources for detailed information regarding the
// Microsoft Foundation Classes product.

#include "stdafx.h"
#include "winhand_.h"

include <stddef.h>        // for offsetof ifdef AFX_CORE1_SEG
pragma code_seg(AFX_CORE1_SEG)
endif ifdef _DEBUG
undef THIS_FILE
static char BASED_CODE THIS_FILE[] = __FILE__;
endif /////////////////////////////////////////////////////////////////////////////
// Globals
```

```cpp
// CWnds for setting z-order with SetWindowPos's pWndInsertAfter parameter
const CWnd AFXAPI_DATA CWnd::wndTop(HWND_TOP);
const CWnd AFXAPI_DATA CWnd::wndBottom(HWND_BOTTOM);
const CWnd AFXAPI_DATA CWnd::wndTopMost(HWND_TOPMOST);
const CWnd AFXAPI_DATA CWnd::wndNoTopMost(HWND_NOTOPMOST);

const char NEAR _afxWnd[] = "AfxWnd";
const char NEAR _afxWndControlBar[] = "AfxControlBar";
const char NEAR _afxWndMDIFrame[] = "AfxMDIFrame";
const char NEAR _afxWndFrameOrView[] = "AfxFrameOrView";

// Special window creation
static CWnd* NEAR pWndInit = NULL;          // shared global with modal usage
static HHOOK NEAR hHookOldSendMsg = NULL;   // shared global with modal usage LRESULT CALLBACK AFX_EXPORT
AfxWndProc(HWND hWnd, UINT message, WPARAM wParam, LPARAM lParam)
{
    CWnd* pWnd;

pWnd = CWnd::FromHandlePermanent(hWnd);
    ASSERT(pWnd != NULL);
    ASSERT(pWnd->m_hWnd == hWnd);

LRESULT lResult = _AfxCallWndProc(pWnd, hWnd, message, wParam, lParam);

return lResult;
}

///////////////////////////////////////////////////////////////////////////
// Window creation hook pragma optimize("q", off)
    // disable pcode optimization (for Win 3.0 compatibility)

LRESULT CALLBACK AFX_EXPORT
_AfxSendMsgHook(int code, WPARAM wParam, LPARAM lParam)
{
    struct HOOKINFO     // Hook info struct passed by send message hook
    {
        LPARAM lParam;
        WPARAM wParam;
        UINT msg;
        HWND hWnd;
    };
    HOOKINFO FAR* hookInfo;

if (code < 0)
    {
        if (!afxData.bWin31)
        {
#ifdef STRICT
            return ::DefHookProc(code, wParam, lParam,
                    &hHookOldSendMsg);
#else
            return ::DefHookProc(code, wParam, lParam, (HOOKPROC FAR*)&hHookOldSendMsg);
endif
        }
        else
        {
            ASSERT(hHookOldSendMsg != NULL);
            return ::CallNextHookEx(hHookOldSendMsg, code, wParam, lParam);
        }
    }

ASSERT(pWndInit != NULL);
    hookInfo = (HOOKINFO FAR*)lParam;
    HWND hWnd = hookInfo->hWnd;

// ignore non-creation messages
    if (hookInfo->msg != WM_GETMINMAXINFO && hookInfo->msg != WM_NCCREATE)
    {
        // not being constructed
        return 0L;
    }
```

```
        if (CWnd::FromHandlePermanent(hWnd) != NULL)
        {
            // already constructed
            ASSERT(pWndInit != CWnd::FromHandlePermanent(hWnd));
            return 0L;
        }

// Connect the HWND to pWndInit...
        pWndInit->Attach(hWnd);

// Subclass the window by replacing its window proc addr...
        WNDPROC oldWndProc = (WNDPROC)::SetWindowLong(hWnd, GWL_WNDPROC,
            (DWORD)AfxWndProc);
        if (oldWndProc != (WNDPROC)AfxWndProc)
        {
            *(pWndInit->GetSuperWndProcAddr()) = oldWndProc; // save if not default
        }

// Unhook the send message hook since we don't need it any more
        if (!afxData.bWin31)
            ::UnhookWindowsHook(WH_CALLWNDPROC, (HOOKPROC)_AfxSendMsgHook);
        else
            ::UnhookWindowsHookEx(hHookOldSendMsg);
        pWndInit = NULL;
        return 0L;
}
pragma optimize("", on)    // return to default optimizations void PASCAL _AfxHookWindowCreate(CWnd* pWnd)
{
        if (!afxData.bWin31)
        {
            hHookOldSendMsg = (HHOOK)::SetWindowsHook(WH_CALLWNDPROC,
                (HOOKPROC)_AfxSendMsgHook);
        }
        else
        {
#ifndef _USRDLL
            // Just set the hook for this task
            hHookOldSendMsg = ::SetWindowsHookEx(WH_CALLWNDPROC,
                (HOOKPROC)_AfxSendMsgHook, _AfxGetHookHandle(),
                ::GetCurrentTask());
#else
            // DLL hook must be set for everyone
            hHookOldSendMsg = ::SetWindowsHookEx(WH_CALLWNDPROC,
                (HOOKPROC)_AfxSendMsgHook, _AfxGetHookHandle(), NULL);
#endif
        }

ASSERT(pWnd != NULL);
        ASSERT(pWnd->m_hWnd == NULL);    // only do once

ASSERT(pWndInit == NULL);        // hook not already in progress
        pWndInit = pWnd;
}

BOOL PASCAL _AfxUnhookWindowCreate()
        // return TRUE if already unhooked
{
        if (pWndInit == NULL)
            return TRUE;                 // already unhooked => window create success
        if (!afxData.bWin31)
            ::UnhookWindowsHook(WH_CALLWNDPROC, (HOOKPROC)_AfxSendMsgHook);
        else
            ::UnhookWindowsHookEx(hHookOldSendMsg);
        pWndInit = NULL;
        return FALSE;
}

/////////////////////////////////////////////////////////////////////////////
// Message table implementation IMPLEMENT_DYNCREATE(CWnd, CCmdTarget)

BEGIN_MESSAGE_MAP(CWnd, CCmdTarget)
        //{{AFX_MSG_MAP(CWnd)
        ON_WM_COMPAREITEM()
```

```
    ON_WM_MEASUREITEM()
    ON_WM_DRAWITEM()
    ON_WM_DELETEITEM()
    ON_WM_CTLCOLOR()
    ON_WM_NCDESTROY()

// VBX support and control reflection
    ON_MESSAGE(WM_VBXEVENT, OnVBXEvent)

// VBX support
    ON_WM_HSCROLL()
    ON_WM_VSCROLL()
    ON_WM_PARENTNOTIFY()
    //}}AFX_MSG_MAP
END_MESSAGE_MAP()

union MessageMapFunctions
{
    AFX_PMSG pfn;    // generic member function pointer // specific type safe variants
    BOOL    (AFX_MSG_CALL CWnd::*pfn_bD)(CDC*);
    BOOL    (AFX_MSG_CALL CWnd::*pfn_bb)(BOOL);
    BOOL    (AFX_MSG_CALL CWnd::*pfn_bWww)(CWnd*, UINT, UINT);
    HBRUSH  (AFX_MSG_CALL CWnd::*pfn_hDWw)(CDC*, CWnd*, UINT);
    int     (AFX_MSG_CALL CWnd::*pfn_iwWw)(UINT, CWnd*, UINT);
    int     (AFX_MSG_CALL CWnd::*pfn_iWww)(CWnd*, UINT, UINT);
    int     (AFX_MSG_CALL CWnd::*pfn_is)(LPSTR);
    LRESULT (AFX_MSG_CALL CWnd::*pfn_lwl)(WPARAM, LPARAM);
    LRESULT (AFX_MSG_CALL CWnd::*pfn_lwwM)(UINT, UINT, CMenu*);
    void    (AFX_MSG_CALL CWnd::*pfn_vv)(void);

void    (AFX_MSG_CALL CWnd::*pfn_vw)(UINT);
    void    (AFX_MSG_CALL CWnd::*pfn_vww)(UINT, UINT);
    void    (AFX_MSG_CALL CWnd::*pfn_vvii)(int, int);
    void    (AFX_MSG_CALL CWnd::*pfn_vwww)(UINT, UINT, UINT);
    void    (AFX_MSG_CALL CWnd::*pfn_vwii)(UINT, int, int);
    void    (AFX_MSG_CALL CWnd::*pfn_vwl)(WPARAM, LPARAM);
    void    (AFX_MSG_CALL CWnd::*pfn_vbWW)(BOOL, CWnd*, CWnd*);
    void    (AFX_MSG_CALL CWnd::*pfn_vD)(CDC*);
    void    (AFX_MSG_CALL CWnd::*pfn_vM)(CMenu*);
    void    (AFX_MSG_CALL CWnd::*pfn_vMwb)(CMenu*, UINT, BOOL);

void    (AFX_MSG_CALL CWnd::*pfn_vW)(CWnd*);
    void    (AFX_MSG_CALL CWnd::*pfn_vWww)(CWnd*, UINT, UINT);
    void    (AFX_MSG_CALL CWnd::*pfn_vWh)(CWnd*, HANDLE);
    void    (AFX_MSG_CALL CWnd::*pfn_vwW)(UINT, CWnd*);
    void    (AFX_MSG_CALL CWnd::*pfn_vwWb)(UINT, CWnd*, BOOL);
    void    (AFX_MSG_CALL CWnd::*pfn_vwwW)(UINT, UINT, CWnd*);
    void    (AFX_MSG_CALL CWnd::*pfn_vs)(LPSTR);
    void    (AFX_MSG_CALL CWnd::*pfn_vOWNER)(int, LPSTR);    // force return TRUE
    int     (AFX_MSG_CALL CWnd::*pfn_iis)(int, LPSTR);
    UINT    (AFX_MSG_CALL CWnd::*pfn_wp)(CPoint);
    UINT    (AFX_MSG_CALL CWnd::*pfn_wv)(void);
    void    (AFX_MSG_CALL CWnd::*pfn_vPOS)(WINDOWPOS FAR*);
    void    (AFX_MSG_CALL CWnd::*pfn_vCALC)(BOOL, NCCALCSIZE_PARAMS FAR*);
};

/////////////////////////////////////////////////////////////////////////////
// Routines for fast search of message maps ifdef _PORTABLE
// C versions of search routines
AFX_MSGMAP_ENTRY FAR* PASCAL
_AfxFindMessageEntry(AFX_MSGMAP_ENTRY FAR* lpEntry, UINT nMsg, UINT nID)
{
    while (lpEntry->nSig != AfxSig_end)
    {
        if (lpEntry->nMessage == nMsg && lpEntry->nID == nID)
            return lpEntry;
        lpEntry++;
    }
    return NULL;    // not found
}
else
// Hand tuned routine pragma optimize("qgel", off)  // assembler cannot be globally optimized
```

```
AFX_MSGMAP_ENTRY FAR* PASCAL
_AfxFindMessageEntry(AFX_MSGMAP_ENTRY FAR* lpEntry, UINT nMsg, UINT nID)
{
// 16-bit Intel x86 version.

ASSERT(offsetof(AFX_MSGMAP_ENTRY, nMessage) == 0);
    ASSERT(offsetof(AFX_MSGMAP_ENTRY, nID) == 2);
    ASSERT(offsetof(AFX_MSGMAP_ENTRY, nSig) == 4);

_asm
    {
                    LES     BX,lpEntry
                    MOV     AX,nMsg
                    MOV     DX,nID
        __loop:
                    MOV     CX,WORD PTR ES:[BX+4]       ; nSig (0 => end)
                    JCXZ    __failed
                    CMP     AX,WORD PTR ES:[BX]         ; nMessage
                    JE      __found_1
        __next:
                    ADD     BX,SIZE AFX_MSGMAP_ENTRY
                    JMP     short __loop
        __found_1:
                    CMP     DX,WORD PTR ES:[BX+2]       ; nID
                    JNE     __next
        // found a match
                    MOV     WORD PTR lpEntry,BX         ; return ES:BX
                    JMP     short __end
        __failed:
                    XOR     AX,AX                       ; return NULL
                    MOV     WORD PTR lpEntry,AX
                    MOV     WORD PTR lpEntry+2,AX
        __end:
    }
    return lpEntry;

} pragma optimize("", on)    // return to default optimizations
endif  // !_PORTABLE ///////////////////////////////////////////////////////////////////////////
// Cache of most recently sent messages ifndef iHashMax
// iHashMax must be a power of two
    #ifdef _NEARDATA
        #define iHashMax 64
    #else
        #define iHashMax 256
    #endif
endif struct AFX_MSG_CACHE
{
    UINT nMsg;
    AFX_MSGMAP_ENTRY FAR* lpEntry;
    AFX_MSGMAP* pMessageMap;
};

AFX_MSG_CACHE _afxMsgCache[iHashMax];

LRESULT CWnd::WindowProc(UINT nMsg, WPARAM wParam, LPARAM lParam)
{
    AFX_MSGMAP* pMessageMap;
    AFX_MSGMAP_ENTRY FAR* lpEntry;

if (nMsg == WM_COMMAND) // special case for commands
    {
        if (OnCommand(wParam, lParam))
            return 1L; // command handled
        else
            return (LRESULT)DefWindowProc(nMsg, wParam, lParam);
    } pMessageMap = GetMessageMap();
    UINT iHash = (_AFX_FP_OFF(pMessageMap) ^ nMsg) & (iHashMax-1);
    AFX_MSG_CACHE& msgCache = _afxMsgCache[iHash];
```

```
if (nMsg == msgCache.nMsg && pMessageMap == msgCache.pMessageMap)
{
    // Cache hit
    lpEntry = msgCache.lpEntry;
    if (lpEntry == NULL)
        return (LRESULT)DefWindowProc(nMsg, wParam, lParam);
    else if (nMsg < 0xC000)
        goto LDispatch;
    else
        goto LDispatchRegistered;
}
else
{
    // not in cache, look for it
    msgCache.nMsg = nMsg;
    msgCache.pMessageMap = pMessageMap;

for (/* pMessageMap already init'ed */; pMessageMap != NULL;
        pMessageMap = pMessageMap->pBaseMessageMap)
    {
        // This may loop forever if the message maps are not properly
        // chained together.  Make sure each window class's message map
        // points to the base window class's message map.

if (nMsg < 0xC000)
        {
            // constant window message
            if ((lpEntry = _AfxFindMessageEntry(pMessageMap->lpEntries,
                nMsg, 0)) != NULL)
            {
                msgCache.lpEntry = lpEntry;
                goto LDispatch;
            }
        }
        else
        {
            // registered windows message
                lpEntry = pMessageMap->lpEntries;

while ((lpEntry = _AfxFindMessageEntry(lpEntry, 0xC000, 0))
                    != NULL)
                {
#ifndef _WINDLL
                    UINT NEAR* pnID = (UINT NEAR*)(lpEntry->nSig);
#else
                    // if SS!=DS, then REGISTERED message must be
                    //    in same data segment as the message map
                    UINT FAR* pnID = (UINT FAR*)MAKELONG(lpEntry->nSig,
                            _AFX_FP_SEG(pMessageMap));
#endif
                    ASSERT(*pnID >= 0xC000);
                        // must be successfully registered
                    if (*pnID == nMsg)
                    {
                        msgCache.lpEntry = lpEntry;
                        goto LDispatchRegistered;
                    }
                    lpEntry++;     // keep looking past this one
                }
        }
    } msgCache.lpEntry = NULL;
        return DefWindowProc(nMsg, wParam, lParam);
    }
    ASSERT(FALSE);    // not reached LDispatch:
    ASSERT(nMsg < 0xC000);
    union MessageMapFunctions mmf;
    mmf.pfn = lpEntry->pfn;

switch (lpEntry->nSig)
    {
    default:
        ASSERT(FALSE);
        return 0;

case AfxSig_bD:
```

```
            return (this->*mmf.pfn_bD)(CDC::FromHandle((HDC)wParam));

case AfxSig_bb:         // AfxSig_bb, AfxSig_bw, AfxSig_bh
            return (this->*mmf.pfn_bb)((BOOL)wParam);

case AfxSig_bWww:       // really AfxSig_bWiw
            return (this->*mmf.pfn_bWww)(CWnd::FromHandle((HWND)wParam),
                    (short)LOWORD(lParam), HIWORD(lParam));

case AfxSig_hDWw:
            {
                    // special case for OnCtlColor to avoid too many temporary objects
                    CDC dcTemp;
                    CWnd wndTemp;
                    UINT nCtlType;

dcTemp.m_hDC = (HDC)wParam;
                    wndTemp.m_hWnd = (HWND)LOWORD(lParam);
                    nCtlType = HIWORD(lParam);
                    CWnd* pWnd = CWnd::FromHandlePermanent(wndTemp.m_hWnd);
                    // if not coming from a permanent window, use stack temporary
                    if (pWnd == NULL)
                            pWnd = &wndTemp;
                    HBRUSH hbr = (this->*mmf.pfn_hDWw)(&dcTemp, pWnd, nCtlType);
                    // fast detach of temporary objects
                    dcTemp.m_hDC = NULL;
                    wndTemp.m_hWnd = NULL;
                    return (LRESULT)(UINT)hbr;
            } case AfxSig_iwWw:
            return (this->*mmf.pfn_iwWw)(wParam,
                    CWnd::FromHandle((HWND)LOWORD(lParam)), HIWORD(lParam));

case AfxSig_iWww:       // really AfxSig_iWiw
            return (this->*mmf.pfn_iWww)(CWnd::FromHandle((HWND)wParam),
                    (short)LOWORD(lParam), HIWORD(lParam));

case AfxSig_is:
            return (this->*mmf.pfn_is)((LPSTR)lParam);

case AfxSig_lwl:
            return (this->*mmf.pfn_lwl)(wParam, lParam);

case AfxSig_lwwM:
            return (this->*mmf.pfn_lwwM)(wParam, LOWORD(lParam),
                    CMenu::FromHandle((HMENU)HIWORD(lParam)));

case AfxSig_vv:
            (this->*mmf.pfn_vv)();
            return 0;

case AfxSig_vw: // AfxSig_vb, AfxSig_vh
            (this->*mmf.pfn_vw)(wParam);
            return 0;

case AfxSig_vww:
            (this->*mmf.pfn_vww)(wParam, LOWORD(lParam));
            return 0;

case AfxSig_vvii:
            (this->*mmf.pfn_vvii)(LOWORD(lParam), HIWORD(lParam));
            return 0;

case AfxSig_vwww:
            (this->*mmf.pfn_vwww)(wParam, LOWORD(lParam), HIWORD(lParam));
            return 0;

case AfxSig_vwii:
            (this->*mmf.pfn_vwii)(wParam, LOWORD(lParam), HIWORD(lParam));
            return 0;

case AfxSig_vwl:
            (this->*mmf.pfn_vwl)(wParam, lParam);
            return 0;

case AfxSig_vbWW:
            (this->*mmf.pfn_vbWW)((BOOL)wParam,
```

```
                CWnd::FromHandle((HWND)LOWORD(lParam)),
                CWnd::FromHandle((HWND)HIWORD(lParam)));
            return 0;

case AfxSig_vD:
            (this->*mmf.pfn_vD)(CDC::FromHandle((HDC)wParam));
            return 0;

case AfxSig_vM:
            (this->*mmf.pfn_vM)(CMenu::FromHandle((HMENU)wParam));
            return 0;

case AfxSig_vMwb:
            (this->*mmf.pfn_vMwb)(CMenu::FromHandle((HMENU)wParam),
                LOWORD(lParam), (BOOL)HIWORD(lParam));
            return 0;

case AfxSig_vW:
            (this->*mmf.pfn_vW)(CWnd::FromHandle((HWND)wParam));
            return 0;

case AfxSig_vWww:
            (this->*mmf.pfn_vWww)(CWnd::FromHandle((HWND)wParam), LOWORD(lParam),
                HIWORD(lParam));
            return 0;

case AfxSig_vWh:
            (this->*mmf.pfn_vWh)(CWnd::FromHandle((HWND)wParam),
                    (HANDLE)LOWORD(lParam));
            return 0;

case AfxSig_vwW:
            (this->*mmf.pfn_vwW)(wParam, CWnd::FromHandle((HWND)LOWORD(lParam)));
            return 0;

case AfxSig_vwWb:
            (this->*mmf.pfn_vwWb)(wParam, CWnd::FromHandle((HWND)LOWORD(lParam)),
                (BOOL)HIWORD(lParam));
            return 0;

case AfxSig_vwwW:
            (this->*mmf.pfn_vwwW)(wParam, LOWORD(lParam),
                CWnd::FromHandle((HWND)HIWORD(lParam)));
            return 0;

case AfxSig_vs:
            (this->*mmf.pfn_vs)((LPSTR)lParam);
            return 0;

case AfxSig_vOWNER:
            (this->*mmf.pfn_vOWNER)((int)wParam, (LPSTR)lParam);
            return TRUE;

case AfxSig_iis:
            return (this->*mmf.pfn_iis)((int)wParam, (LPSTR)lParam);

case AfxSig_wp:  // really AfxSig_ip
            return (short)(this->*mmf.pfn_wp)(*(CPoint*)&lParam);

case AfxSig_wv:  // AfxSig_bv, AfxSig_wv
            return (this->*mmf.pfn_wv)();

case AfxSig_vCALC:
            (this->*mmf.pfn_vCALC)((BOOL)wParam, (NCCALCSIZE_PARAMS FAR*)lParam);
            return 0;

case AfxSig_vPOS:
            (this->*mmf.pfn_vPOS)((WINDOWPOS FAR*)lParam);
            return 0;

}
    ASSERT(FALSE);       // not reached

LDispatchRegistered:     // for registered windows messages
    ASSERT(nMsg >= 0xC000);
    mmf.pfn = lpEntry->pfn;
    return (this->*mmf.pfn_lwl)(wParam, lParam);
}
```

We claim:

1. A method in a computer system for generating a data structure for accessing virtual function members of a derived class, the derived class having a base class, the base class having a plurality of virtual function members, the derived class having a virtual function member, the method comprising the computer-implemented steps of:

creating a message entry table of message entries for the base class, each message entry identifying a virtual function member of the base class;

creating a message map for the base class and storing in the message map for the base class a reference to the message entry table for the base class;

creating a virtual function table for the base class and storing in the virtual function table for the base class a reference to a get message map function, the get message map function, when invoked, returns a reference to the message map for the base class;

creating a message entry table of a message entries for the derived class, the message entry table for the derived class having a message entry identifying the overriding virtual function member of the derived class;

creating a message map for the derived class and storing in the message map for the derived class a reference to the message entry table for the derived class and a reference to the message map for the base class; and creating a virtual function table for the derived class and storing in the virtual function table for the derived class a reference to a get message map function, the get message map function, when invoked, returns a reference to the message map for the derived class; and wherein when a visual function member of the derived class is invoked, the reference to the message entry table of the derived class is retrieved using the get message map function for the derived class and the message map for derived class, the message entry table for the derived class is searched to determine whether it contains a message entry that identifies the virtual function member to be invoked, and the message entry table for the base class is searched to determine whether it contains a message entry that identifies the virtual function member to be invoked.

2. A method in a computer system for accessing a virtual function member of a derived class, the derived class having a base class, the a base class having virtual function members, the derived class having virtual function members, the method comprising the computer-implemented steps of:

retrieving a reference to a message map for the derived class;

retrieving from the message map for the derived class a reference to a message entry table of message entries for the derived class, each message entry identifying a virtual function member of the derived class;

searching the message entry table for the derived class for a message entry that identifies the virtual function member to be accessed;

when the message entry table for the derived class contains a message entry that identifies the virtual function member to be accessed, invoking the identified virtual function member; and when the message entry table for the derived class does not contain a message entry that identifies the virtual function member to be accessed, retrieving from the message map for the derived class a reference to a message map for the base class;

retrieving from the message map of the base class a reference to a message entry table of message entries for the base class, each message entry identifying a virtual function member of the base class;

searching the message entry table for the base class for a message entry that identifies the virtual function member to be accessed; and when the message entry table for the base class contains a message entry that identifies the virtual function member to be accessed, invoking the identified virtual function member.

3. The method of claim 2, including the steps of:

maintaining a cache of recently searched for message entries; and before searching a message entry table, searching the cache for a message entry that identifies the virtual function member to be accessed.

4. A method in a computer system for accessing a virtual function member of a derived class, the derived class having a base class, the base class having a plurality of virtual function members, the derived class having a visual function member, the method comprising the computer-implemented steps of:

searching a message entry table of message entries for the derived class for a message entry that identifies the virtual function member to be accessed;

when the message entry table for the derived class contains a message entry that identifies the virtual function member to be accessed, invoking the identified virtual function member; and when the message entry table for the derived class does not contain a message entry that identifies the virtual function member to be accessed, retrieving from a message map for the derived class a reference to a message map for the base class;

retrieving from the message map for the base class a reference to a message entry table of message entries for the base class, each message entry identifying a virtual function member of the base class;

searching the message entry table for the base class for a message entry that identifies the virtual function member to be accessed; and when the message entry table for the base class contains a message entry that identifies the virtual function member to be accessed, invoking the identified virtual function member.

5. The method of claim 4, including the steps of:

maintaining a cache of recently searched for message entries; and before searching a message entry table, searching the cache for a message entry that identifies the virtual function member to be accessed.

6. A method in a computer system for locating a non-overridden virtual function member that is defined in a base class and not overridden in a derived class, the base class having a message entry table of message entries that identify a plurality of virtual function members defined in the base class, the derived class having a message entry table of message entries that identify a plurality of virtual function members of the derived class, each message entry having a pointer to the identified virtual function member, the method comprising the computer-implemented steps of:

searching the message entry table for the derived class for a message entry that identifies the non-overridden virtual function member;

after determining that the message entry table for the derived class has no message entry that identifies the non-overridden virtual table for the derived searching the message entry table for the base class for a message entry that identifies the non-overridden virtual function member wherein when the message entry that identifies the non-overridden virtual function member is found in the message entry table for the base class, the pointer to the non-overridden virtual function member in the found message entry is used to invoke the non-overridden virtual function member.

7. The method of claim 6, including the step of:

when finding a message entry that identifies the non-overridden virtual function member, storing in a cache the identification of the non-overridden virtual function member and the pointer to the non-overridden virtual function member so that on subsequent invocations of the non-overridden virtual function member, the pointer to the non-overridden virtual function member can be retrieved from the cache rather than searching through the message entry tables.

8. The method of claim 6 wherein the derived class has a message map that contains a reference to the message entry table for the derived class and a reference to a message map for the base class, the message map for the base class having a reference to the message entry table for the base class, the method including the steps of:

before searching the message entry table for the derived class, retrieving from the message map for the derived class the reference to the message entry table for the derived class; and before searching the message entry table for the base class, retrieving from the message map for the derived class the reference to the message map for the base class; and retrieving from the message map for the base class the reference to the message entry table for the base class.

9. The method of claim 8 wherein the derived class has virtual function table with a reference to a get message map function that, when invoked, returns a reference to the message map for the derived class, the method including the step of:

before retrieving from the message map for the derived class the reference to the message entry table for the derived class, retrieving the reference to the get message map function from the virtual function table of the derived class; and invoking the get message map function to retrieve the reference to the message map for the derived class.

10. A computer system for accessing virtual function members of a derived class, the derived class having a base class, the base class having a plurality of virtual function members, the derived class having a virtual function member, the computer system comprising:

means for generating a message entry table of message entries for the base class, each message entry identifying a virtual function member of the base class;

means for generating a message map for the base class, fire message map for the base class containing a reference to the message entry table for the base class;

means for generating a message entry table for the derived class having a message entry, the message entry identifying the virtual function member of the derived class;

means for generating a message map for the derived class, the message map for the derived class containing a reference to the message entry table for the derived class and a reference to the message map for the base class;

means for generating a virtual function table for the derived class, the virtual function table for the derived class containing a reference to a get message map function, the get message map function, when invoked, for returning a reference to the message map of the derived class; and means for invoking the get message map function to retrieve the message map for the derived class, means for searching the message entry table of the derived class as referenced by the retrieved message map for the derived class for a virtual function member, means for retrieving the message map for the base class as referenced by the message map for the derived class, means for searching the message entry table of the base class as referenced by the retrieved message map for the base class for the virtual function member, and means for invoking the virtual function member when the virtual function member is found in the message entry table for the derived class or the base class to effect the accessing of the virtual function member.

11. The computer system of claim 10 wherein the message maps and the message entry tables are explicitly defined using programming language constructs.

12. The computer system of claim 10 including means for generating a virtual function table for the base class, the virtual function table for the base class containing a reference to a get message map function, the get message map function, when invoked, for returning a reference to the message map for the base class.

* * * * *

UNITED STATES PATENT AND TRADEMARK OFFICE
CERTIFICATE OF CORRECTION

PATENT NO.   : 5,442,793
DATED        : August 15, 1995
INVENTOR(S)  : Bradford A. Christian, Scott A. Randell and Steven J. Sinofsky It is certified that error appears in the above identified patent and that said Letters Patent is hereby corrected as shown below:

In column 47, claim 1, line 36, please delete "visual" and substitute therefore --virtual--.

In column 47, claim 2, line 53, after "the", please delete "a".

In column 48, claim 4, line 29, please delete "visual" and substitute therefore --virtual--.

In column 49, claim 6, line 8, please delete "table for the derived" and substitute therefore --function member,--.

In column 50, claim 10, line 15, please delete "fire" and substitute therefore --the--.

Signed and Sealed this

Ninth Day of January, 1996

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,442,793                                          Page 1 of 2
DATED     : August 15, 1995
INVENTOR(S) : Bradford A. Christain, Scott A. Randell and Steven J. Sinofsky It is certified that error appears in the above-indentified patent and that said Letters Patent is hereby corrected as shown below:

On the title page: Item [56]

On the cover page, after "Assistant Examiner-", please change "Backenstose" to --Jonathan Hall Baćkenstose--.

In column 47, claim 1, line 36, please delete "visual" and substitute therefore --virtual--.

In column 47, claim 1, line 45, after "and", please insert --when the message entry table for the derived class does not contain a message entry that identifies the virtual function member to be invoked,
        the reference to the message entry table for the base class is retrieved using the reference to the message map for the base class stored in the message map for the derived class, and--.

UNITED STATES PATENT AND TRADEMARK OFFICE
CERTIFICATE OF CORRECTION

PATENT NO. : 5,442,793
DATED : August 15, 1995
INVENTOR(S) : Bradford A. Christain, Scott A. Randell and Steven J. Sinofsky It is certified that error appears in the above-indentified patent and that said Letters Patent is hereby corrected as shown below:

In column 47, claim 2, line 53, after "the", please delete "a".

In column 48, claim 4, line 29, please delete "visual" and substitute therefore --virtual--.

In column 49, claim 6, line 8, please delete "table for the derived" and substitute therefore --function member--.

In column 50, claim 10, line 15, please delete "fire" and substitute therefore --the--.

Signed and Sealed this

Thirtieth Day of April, 1996

Attest:

BRUCE LEHMAN

*Attesting Officer*  *Commissioner of Patents and Trademarks*